United States Patent
Wang

(10) Patent No.: US 10,866,730 B2
(45) Date of Patent: Dec. 15, 2020

(54) TOUCH SCREEN-BASED CONTROL METHOD AND APPARATUS

(71) Applicant: TENCENT TECHNOLOGY (SHENZHEN) COMPANY LIMITED, Shenzhen (CN)

(72) Inventor: Yiran Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 66 days.

(21) Appl. No.: 16/358,234

(22) Filed: Mar. 19, 2019

(65) Prior Publication Data

US 2019/0212916 A1 Jul. 11, 2019

Related U.S. Application Data

(63) Continuation of application No. PCT/CN2017/110817, filed on Nov. 14, 2017.

(30) Foreign Application Priority Data

Nov. 16, 2016 (CN) .......................... 2016 1 1009412

(51) Int. Cl.
*G06F 3/048* (2013.01)
*G06F 3/0488* (2013.01)
(Continued)

(52) U.S. Cl.
CPC ...... *G06F 3/04886* (2013.01); *A63F 13/2145* (2014.09); *A63F 13/426* (2014.09);
(Continued)

(58) Field of Classification Search
CPC ............... G06F 3/04886; G06F 3/0488; G06F 3/04817; G06F 3/0482; G06F 3/0486;
(Continued)

(56) References Cited

U.S. PATENT DOCUMENTS 7,720,552 B1 * 5/2010 Lloyd ................. G06F 3/04847
 700/10
7,966,575 B1 * 6/2011 Jetha ..................... G06F 3/0482
 715/817
(Continued)

FOREIGN PATENT DOCUMENTS

CN 102156580 8/2011
CN 102542174 A 7/2012
(Continued)

OTHER PUBLICATIONS

Taiwanese Office Action dated May 16, 2018 in Application Publication No. 10720439010.

(Continued)

*Primary Examiner* — Steven B Theriault
(74) *Attorney, Agent, or Firm* — Oblon, McClelland, Maier & Neustadt, L.L.P.

(57) ABSTRACT

A method, information processing apparatus, and a non-transitory computer-readable storage medium are provided. In the method, a first touch point on a touch screen display is detected. The first touch point is associated with a first icon displayed on the touch screen display. An auxiliary operation icon corresponding to the first icon at a position corresponding to the first touch point, an auxiliary control region that includes the auxiliary operation icon, and an action range candidate region in a displayed scene are output for display on the touch screen display. A first relative coordinate of the auxiliary operation icon within the auxiliary control region is determined. Further, a second relative coordinate of an action indication region to be displayed within the action range candidate region is determined according to the first relative coordinate.

20 Claims, 13 Drawing Sheets

(51) Int. Cl.

| | | |
|---|---|---|
| *G06F 3/0481* | (2013.01) | |
| *G06F 3/0482* | (2013.01) | |
| *G06F 3/0486* | (2013.01) | |
| *A63F 13/2145* | (2014.01) | |
| *G06F 3/0484* | (2013.01) | |
| *A63F 13/822* | (2014.01) | |
| *A63F 13/5375* | (2014.01) | |
| *A63F 13/426* | (2014.01) | |
| *H04L 29/06* | (2006.01) | |
| *A63F 13/23* | (2014.01) | |

(52) U.S. Cl.
CPC ........ *A63F 13/5375* (2014.09); *A63F 13/822* (2014.09); *G06F 3/0482* (2013.01); *G06F 3/0486* (2013.01); *G06F 3/0488* (2013.01); *G06F 3/04817* (2013.01); *G06F 3/04845* (2013.01); *A63F 13/23* (2014.09); *A63F 2300/1025* (2013.01); *A63F 2300/1075* (2013.01); *H04L 67/42* (2013.01)

(58) Field of Classification Search
CPC .............. G06F 3/04845; A63F 13/5375; A63F 13/426; A63F 13/2145; A63F 13/23; A63F 2300/1075
See application file for complete search history.

(56) References Cited

U.S. PATENT DOCUMENTS

| | | | | |
|---|---|---|---|---|
| 8,151,209 B2* | 4/2012 | Law | G06F 3/0236 | 715/773 |
| 8,223,127 B2* | 7/2012 | Park | G06F 3/0362 | 345/169 |
| 8,230,358 B1* | 7/2012 | Chaudhri | G06F 3/0486 | 715/773 |
| 8,239,784 B2* | 8/2012 | Hotelling | G06F 3/0418 | 715/830 |
| 8,406,816 B2* | 3/2013 | Marui | H04M 1/23 | 455/566 |
| 8,519,986 B2* | 8/2013 | Park | G06F 3/0362 | 345/184 |
| 8,587,543 B2* | 11/2013 | Kobayashi | G06F 3/04845 | 345/173 |
| 8,638,315 B2* | 1/2014 | Algreatly | G06F 3/03547 | 345/174 |
| 8,667,413 B2* | 3/2014 | Cheng | G06F 3/0236 | 715/773 |
| 8,836,544 B1* | 9/2014 | Balogh | B60L 58/12 | 340/984 |
| 9,063,644 B2* | 6/2015 | Zeng | G06F 3/04847 | |
| 9,157,750 B2* | 10/2015 | Miichi | G01C 21/3664 | |
| 9,201,570 B2* | 12/2015 | Yamasaki | G06F 3/04847 | |
| 9,517,411 B2* | 12/2016 | Ando | A63F 13/537 | |
| 9,561,432 B2* | 2/2017 | Alexeev | A63F 13/426 | |
| 9,921,669 B2* | 3/2018 | Imai | H05B 47/10 | |
| 9,927,957 B1* | 3/2018 | Sagar | G06F 3/0485 | |
| 10,073,493 B2* | 9/2018 | Takeuchi | G06F 1/1632 | |
| 10,078,410 B1* | 9/2018 | Isaak | G06F 3/048 | |
| 10,088,993 B2* | 10/2018 | Hall | G06F 3/0485 | |
| 10,146,343 B2* | 12/2018 | Sawada | G06F 3/0481 | |
| 10,168,895 B2* | 1/2019 | Feng | G06F 3/04883 | |
| 10,310,706 B2* | 6/2019 | Sirpal | G06F 3/04883 | |
| 10,372,320 B2* | 8/2019 | Dong | G06F 3/04883 | |
| 10,456,667 B2* | 10/2019 | Tang | G06F 3/0488 | |
| 10,500,493 B2* | 12/2019 | Wei | A63F 13/42 | |
| 10,572,131 B2* | 2/2020 | Kim | G06F 3/0488 | |
| 2005/0028111 A1* | 2/2005 | Schrag | G06F 3/04815 | 715/851 |
| 2005/0081164 A1* | 4/2005 | Hama | G06F 3/04855 | 715/830 |
| 2005/0204296 A1* | 9/2005 | Rossler | G06F 16/954 | 715/751 |
| 2006/0026535 A1* | 2/2006 | Hotelling | G06F 3/04883 | 715/863 |
| 2006/0161870 A1* | 7/2006 | Hotelling | G06F 17/00 | 715/863 |
| 2006/0161871 A1* | 7/2006 | Hotelling | G06F 3/0485 | 715/863 |
| 2007/0152983 A1* | 7/2007 | McKillop | G06F 3/03547 | 345/173 |
| 2007/0236475 A1* | 10/2007 | Wherry | G06F 3/04883 | 345/173 |
| 2008/0066013 A1* | 3/2008 | Brodersen | G06F 3/04817 | 715/836 |
| 2008/0211775 A1* | 9/2008 | Hotelling | G06F 3/04883 | 345/168 |
| 2008/0287169 A1* | 11/2008 | Kim | G06F 1/169 | 455/575.4 |
| 2009/0225053 A1* | 9/2009 | Hu | G06F 3/0482 | 345/173 |
| 2010/0174987 A1* | 7/2010 | Shin | G06F 3/04847 | 715/702 |
| 2010/0182264 A1* | 7/2010 | Hahn | G06F 3/0488 | 345/173 |
| 2010/0192104 A1* | 7/2010 | Lee | G06F 3/04883 | 715/834 |
| 2010/0251164 A1* | 9/2010 | Karan | H04M 1/72544 | 715/782 |
| 2011/0172013 A1* | 7/2011 | Shirasaka | A63F 13/92 | 463/37 |
| 2011/0285636 A1* | 11/2011 | Howard | G06F 3/04815 | 345/173 |
| 2011/0320983 A1* | 12/2011 | Chen | H04N 13/275 | 715/836 |
| 2012/0044173 A1* | 2/2012 | Homma | G06F 3/0488 | 345/173 |
| 2012/0218293 A1* | 8/2012 | Yamasaki | G06F 3/0483 | 345/629 |
| 2013/0241828 A1* | 9/2013 | VanBlon | G06F 3/0416 | 345/157 |
| 2013/0241829 A1* | 9/2013 | Kim | G06F 3/03547 | 345/157 |
| 2014/0160073 A1* | 6/2014 | Matsuki | G06F 3/016 | 345/174 |
| 2014/0223376 A1* | 8/2014 | Tarvainen | G06F 3/04847 | 715/833 |
| 2014/0344755 A1* | 11/2014 | Shinde | G06F 3/0482 | 715/834 |
| 2014/0380209 A1 | 12/2014 | Tsukamoto | | |
| 2015/0103001 A1 | 4/2015 | Li et al. | | |
| 2015/0153951 A1* | 6/2015 | Kim | G06F 3/0488 | 715/773 |
| 2015/0205522 A1* | 7/2015 | Zeng | G06F 3/04817 | 715/847 |
| 2015/0324087 A1* | 11/2015 | Gregory | G06F 3/04845 | 345/174 |
| 2016/0088060 A1* | 3/2016 | Rahman | H04L 67/025 | 715/740 |
| 2016/0291848 A1* | 10/2016 | Hall | G06F 3/04883 | |
| 2016/0370958 A1* | 12/2016 | Tsuji | G06F 3/0486 | |
| 2017/0340959 A1 | 11/2017 | Tang et al. | | |
| 2018/0024660 A1* | 1/2018 | Wang | G06F 3/04886 | 273/110 |
| 2018/0028907 A1* | 2/2018 | Weng | A63F 13/87 | |
| 2018/0028918 A1* | 2/2018 | Tang | G06F 3/0484 | |
| 2018/0043260 A1* | 2/2018 | Tang | A63F 13/42 | |

FOREIGN PATENT DOCUMENTS

| | | |
|---|---|---|
| CN | 103870095 | 6/2014 |
| CN | 103870095 A | 6/2014 |
| CN | 104076986 | 10/2014 |
| CN | 104142786 | 11/2014 |
| CN | 104142786 A | 11/2014 |
| CN | 104636063 | 5/2015 |
| CN | 104898953 | 9/2015 |
| CN | 104898953 A | 9/2015 |
| CN | 105194873 | 12/2015 |

(56) References Cited

FOREIGN PATENT DOCUMENTS

| | | |
|---|---|---|
| CN | 105194873 A | 12/2015 |
| CN | 105335065   | 2/2016 |
| CN | 105335065 A | 2/2016 |
| CN | 105879391 A | 8/2016 |
| CN | 106354418   | 1/2017 |
| TW | 201600154 A | 1/2016 |

OTHER PUBLICATIONS

Combined Office Action and Search Report dated Jul. 26, 2017 in Chinese Patent Application No. 201611009412.7 (with Concise English language translation).
Office Action dated Nov. 16, 2017 in Chinese Patent Application No. 201611009412.7 (with Concise English language translation).
Office Action dated Mar. 29, 2018 in Chinese Patent Application No. 201611009412.7 (with Concise English language translation).
Combined Office Action and Search Report dated Mar. 5, 2019 in Chinese Patent Application No. 201611009412.7 (with Concise English language translation).
International Search Report dated Feb. 13, 2018 in PCT/CN2017/110817 filed Nov. 14, 2017. (Wth English Translation).
Written Opinion dated Feb. 13, 2018 in PCT/CN2017/110817 filed 14, 2017. (With English Translation).

* cited by examiner

TOUCH SCREEN-BASED CONTROL METHOD AND APPARATUS

RELATED APPLICATION

This application is a continuation of International Application No. PCT/CN2017/110817, filed on Nov. 14, 2017, which claims priority to Chinese Patent Application No. 201611009412.7, filed on Nov. 16, 2016. The entire disclosures of the prior applications are hereby incorporated by reference in their entirety.

FIELD OF THE TECHNOLOGY

The present disclosure relates to the technical field of control of a touch screen.

BACKGROUND OF THE DISCLOSURE

With the popularity of touch screen devices, there are more and more applications for displaying virtual scenes when the touch screen devices are running. Such applications include, for example, Multiplayer Online Battle Arena Games (MOBA games), scene simulation software, etc. For convenience of user operations, an operation interface of such an application is often provided with an icon selection region in which at least one icon that can be operated by users is displayed, and an icon corresponds to an event executed in a virtual scene. For example, a game interface of an MOBA game is provided with an icon selection region including a skill icon, a skill icon corresponds to a releasable game skill, and a user may select the skill icon of the icon selection region to release a corresponding skill.

When the user selects an icon in the icon selection region, an event corresponding to the icon acts on a scene picture (such as a game picture) and displays an effect. For example, in the MOBA game, after the user selects a skill icon, a skill corresponding to the skill icon will be released in the game picture, and a corresponding skill release effect will be displayed.

To assist the action of an event corresponding to an icon, a scene picture is also provided in an application displaying a virtual scene. After the user selects an icon, an action range candidate region in the scene picture will display an action indication region indicating an event corresponding to the icon, the action indication region being used for indicating the user to select an action range of the event. The action indication region is to assist the user in selecting the action range of the event. Therefore, how to optimize the display of the action indication region to smoothly display the action indication region after the user selects the icon has been a problem studied by those skilled in the art.

SUMMARY

In view of this, the present disclosure discloses a touch screen-based control method and apparatus, intended for example to achieve smooth display of an action indication region on a touch screen.

In one aspect, there is provided a method. For example, the method is performed by processing circuitry of an information processing apparatus. A first touch point is detected on a touch screen display. The first touch point is associated with a first icon displayed on the touch screen display. An auxiliary operation icon corresponding to the first icon at a position corresponding to the first touch point, an auxiliary control region that includes the auxiliary operation icon, and an action range candidate region in a displayed scene are output for display on the touch screen display. A first relative coordinate of the auxiliary operation icon within the auxiliary control region is determined. Further, a second relative coordinate of an action indication region to be displayed within the action range candidate region is determined according to the first relative coordinate.

In one embodiment, the action range candidate region is larger than the auxiliary control region.

In one embodiment, the outputting includes outputting the auxiliary operation icon for display on an operation interface of an application executed by the information processing apparatus. The operation interface is configured to provide an icon selection region for at least one icon that is user selectable and corresponds to an event to be executed in the displayed scene.

In one embodiment, the auxiliary control region that includes the auxiliary operation icon is fully displayed on the operation interface.

In one embodiment, the outputting includes adjusting a position of the auxiliary control region based on a determination that the auxiliary control region when drawn around the auxiliary operation icon cannot be fully displayed on the operation interface.

In one embodiment, the outputting further includes adjusting the position of the auxiliary control region to be tangent to an edge of the touch screen display when the auxiliary control region drawn around the auxiliary operation icon cannot be fully displayed on the operation interface.

In one embodiment, the outputting includes outputting the auxiliary control region at a fixed position of the operation interface that is associated with the first icon.

In one embodiment, the outputting includes determining whether a first event condition corresponding to the first icon is satisfied and outputting the auxiliary operation icon corresponding to the first icon for display at the position corresponding to the first touch point when the first event condition is determined to be satisfied.

In one embodiment, the first event condition is at least one of whether a cooling time of a first event exceeds a preset time, whether the first touch point on the first icon is detected, or whether an event conflicts with the first event.

In one embodiment, the method further includes controlling a first event corresponding to the first icon to occur when the auxiliary operation icon is dragged outside of the auxiliary control region or dragged to another position within the auxiliary control region.

In one embodiment, the method further includes sending a first frame synchronization command that indicates the occurrence of the first event to a server. Further, a second frame synchronization command is broadcast by the server to other clients associated with the displayed scene.

One aspect of the disclosure provides an information processing apparatus including processing circuitry configured to detect a first touch point on a touch screen display that is associated with a first icon displayed on the touch screen display. The processing circuitry is further configured to output, for display on the touch screen display, an auxiliary operation icon corresponding to the first icon at a position corresponding to the first touch point, an auxiliary control region that includes the auxiliary operation icon, and an action range candidate region in a displayed scene. The processing circuitry is configured to determine a first relative coordinate of the auxiliary operation icon within the auxiliary control region. The processing circuitry is further configured to determine a second relative coordinate of an action indication region to be displayed within the action range candidate region according to the first relative coordinate.

In one embodiment, the action range candidate region is larger than the auxiliary control region.

In one embodiment, the auxiliary control region that includes the auxiliary operation icon is fully displayed on an operation interface of an application executed by the processing circuitry. The operation interface is configured to provide an icon selection region for at least one icon that is user selectable and corresponds to an event to be executed in the displayed scene.

In one embodiment, the processing circuitry is configured to adjust a position of the auxiliary control region based on a determination that the auxiliary control region when drawn around the auxiliary operation icon cannot be fully displayed on the operation interface.

In one embodiment, the processing circuitry is further configured to adjust the position of the auxiliary control region to be tangent to an edge of the touch screen display when the auxiliary control region drawn around the auxiliary operation icon cannot be fully displayed on the operation interface.

In one embodiment, the processing circuitry is configured to output the auxiliary control region at a fixed position of the operation interface that is associated with the first icon.

In one embodiment, the processing circuitry is configured to determine whether a first event condition corresponding to the first icon is satisfied and to output the auxiliary operation icon corresponding to the first icon for display at the position corresponding to the first touch point when the first event condition is determined to be satisfied.

In one embodiment, the first event condition is at least one of whether a cooling time of a first event exceeds a preset time, whether the first touch point on the first icon is detected, or whether an event conflicts with the first event.

In one embodiment, the processing circuitry is further configured to control a first event corresponding to the first icon to occur when the auxiliary operation icon is dragged outside of the auxiliary control region or dragged to another position within the auxiliary control region.

In one embodiment, the processing circuitry is configured to send a first frame synchronization command that indicates the occurrence of the first event to a server. Further, a second frame synchronization command is broadcast by the server to other clients associated with the displayed scene through the server.

One aspect of the disclosure provides a non-transitory computer-readable storage medium storing instructions which when executed by at least one processor cause the at least one processor to perform detecting a first touch point on a touch screen display that is associated with a first icon displayed on the touch screen display. The at least one processor is further caused to perform outputting, for display on the touch screen display, an auxiliary operation icon corresponding to the first icon at a position corresponding to the first touch point, an auxiliary control region that includes the auxiliary operation icon, and an action range candidate region in a displayed scene. The at least one processor is further caused to perform determining a first relative coordinate of the auxiliary operation icon within the auxiliary control region and a second relative coordinate of an action indication region to be displayed within the action range candidate region according to the first relative coordinate.

In some embodiments, there are provided a non-transitory computer-readable storage medium storing instructions which when executed by at least one processor cause the at least one processor to perform any of the methods described above.

From the foregoing technical solutions, it can be seen that the present disclosure discloses a touch screen-based control method and apparatus. An auxiliary operation icon is displayed at a position where a user clicks on a first touch point of a first icon, and an auxiliary control region is displayed at a position including the auxiliary operation icon and fully displayed on an operation interface. It is ensured that the auxiliary operation icon is consistent with an actual click position of the user's finger on a touch screen. A first relative coordinate reflects a relative position between the auxiliary operation icon and the auxiliary control region, that is, it reflects a relative position between the actual click position of the user's finger and the auxiliary control region, and a second relative coordinate of the position of an action indication region relative to an action range candidate region is mapped according to the first relative coordinate. Therefore, the relative position of the action indication region in the action range candidate region is kept consistent with the relative position of the actual click position of the user's finger in the auxiliary control region, thereby avoiding a stop-start effect from occurring when the action indication region is displayed on the touch screen, and achieving smooth display of the action indication region on the touch screen.

BRIEF DESCRIPTION OF THE DRAWINGS

To describe the technical solutions of the embodiments of the present disclosure or the related technology more clearly, the following briefly introduces the accompanying drawings for describing the embodiments or the related technology. The accompanying drawings in the following description show embodiments of the present disclosure, and a person of ordinary skill in the art may still derive other drawings from these accompanying drawings.

DESCRIPTION OF EMBODIMENTS

Figure 1:
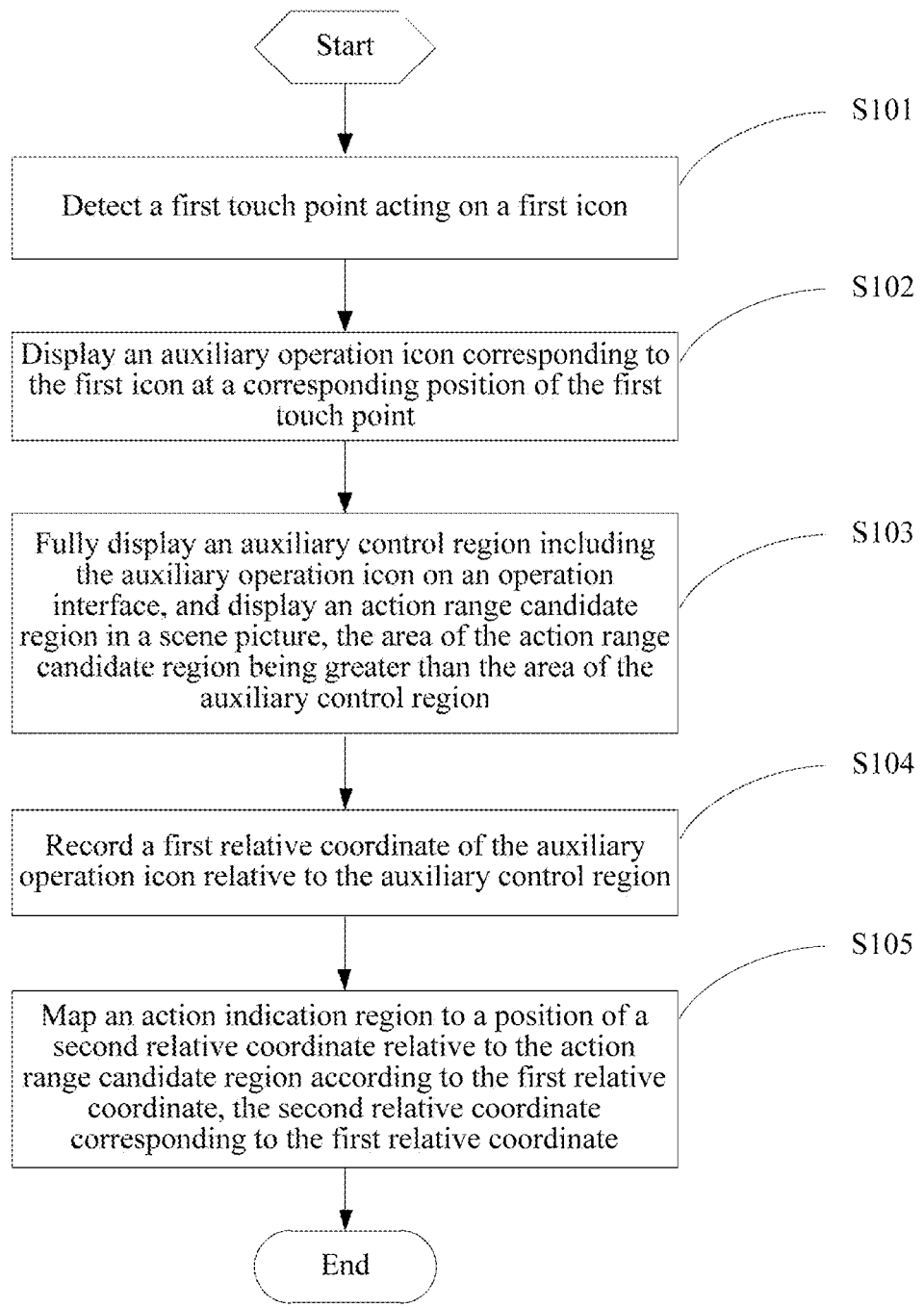
FIG. 1 is a flowchart of a touch screen-based control method according to an embodiment of the present disclosure.

The following describes the technical solutions in the embodiments of the present disclosure with reference to the accompanying drawings in the embodiments of the present disclosure. The described embodiments are some of the embodiments of the present disclosure rather than all of the embodiments. All other embodiments obtained by a person of ordinary skill in the art based on the embodiments of the present disclosure shall fall within the protection scope of the present disclosure.

After study, the inventor finds that in a traditional touch screen-based control method, when a user's finger touches an icon of a touch screen, an auxiliary control region centering on an auxiliary operation icon may appear at a preset fixed position nearby the icon, an action indication region is determined by moving the auxiliary operation icon, and the action indication region is displayed in a range candidate region. Because the click position of the user's finger is not fixed, there is often a situation that the click position of the user's finger is distant from the auxiliary operation icon. Under this situation, when the user drags the auxiliary operation icon to a target position on the touch screen, the auxiliary operation icon will often move to the click position of the user's finger, and then move from the click position of the finger to the target position on the touch screen. Because a relative position of the auxiliary operation icon in the auxiliary control region is consistent with a relative position of the action indication region in the action range candidate region, the action indication region moves in the action range candidate region according to a moving route of the auxiliary operation icon in the auxiliary control region, thereby causing a stop-start effect on the display of the action indication region on the touch screen, that is, a stop-start effect on the occurrence of an event corresponding to the icon in the action range candidate region.

To solve the problem that an action indication region cannot be smoothly displayed in the traditional touch screen-based control method, the present disclosure discloses a touch screen-based control method and apparatus. In the embodiments of the present disclosure, an auxiliary operation icon is displayed at a position where a user clicks on a first touch point of a first icon. It is ensured that the auxiliary operation icon is consistent with an actual click position of the user's finger on a touch screen. A first relative coordinate reflects a relative position between the auxiliary operation icon and the auxiliary control region, that is, it reflects a relative position between the actual click position of the user's finger and the auxiliary control region, and the position of a second relative coordinate of an action indication region in an action range candidate region is obtained by mapping according to the first relative coordinate. Therefore, the relative position of the action indication region in the action range candidate region is kept consistent with the relative position of the actual click position of the user's finger in the auxiliary control region, thereby preventing a stop-start effect from occurring when the action indication region is displayed, and achieving smooth display of the action indication region on the touch screen.

Figure 2A:
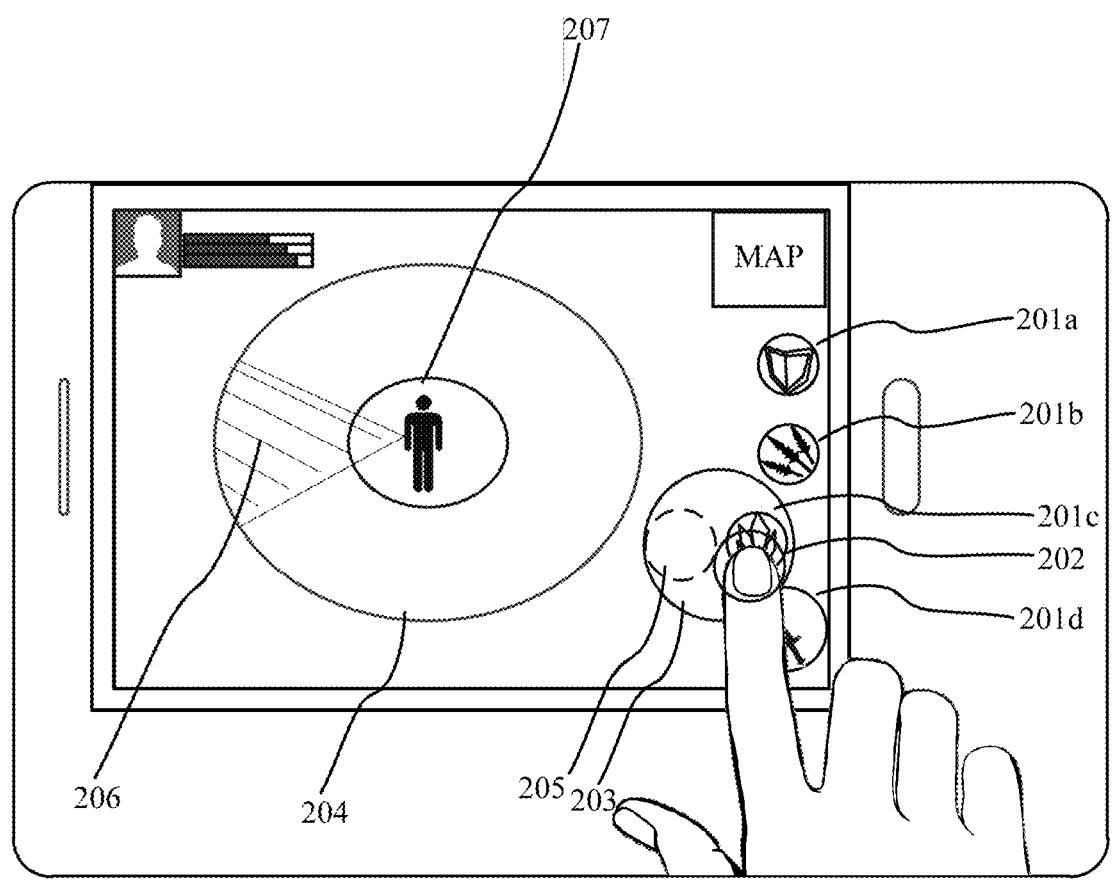
FIG. 2a illustrates a first interface for implementing a touch screen-based control method on a terminal according to an embodiment of the present disclosure.
Figure 2B:
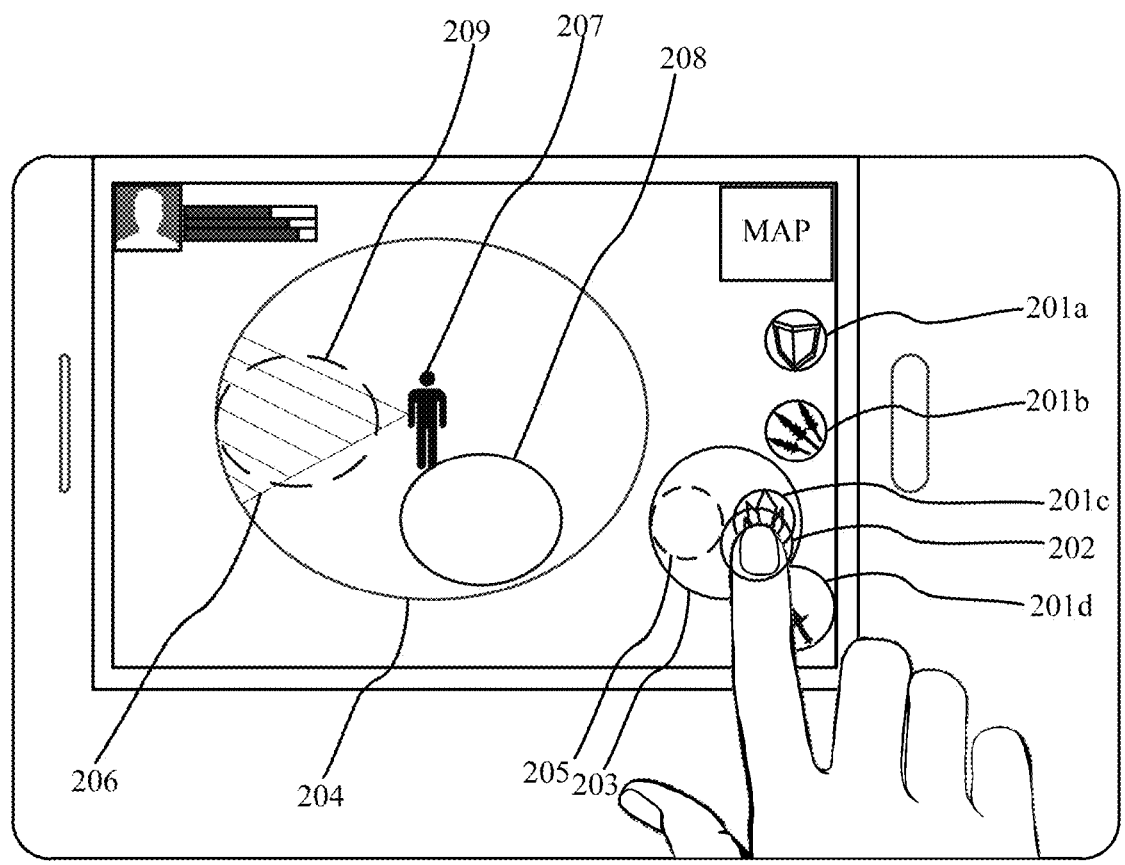
FIG. 2b illustrates a first interface for implementing a touch screen-based control method on a terminal according to an embodiment of the present disclosure.

Referring to FIG. 2b, in the embodiments of the present disclosure, a user's finger clicks on a first touch point position of a first icon 201c, and displays an auxiliary operation icon 202 at the position. Because the position of the auxiliary operation icon 202 is consistent with the click position of the user's finger, when the click position of the user's finger moves to a position 205, the auxiliary operation icon 202 also directly moves to the position 205. An action indication region 208 will also be directly mapped to a position 209 since a relative position of the action indication region in the action range candidate region is kept consistent with a relative position of the actual click position of the user's finger in the auxiliary control region, thereby achieving smooth display of the action indication region on the touch screen.

Illustratively, a hardware scene of the method described in the embodiments of the present disclosure may be, for example, a terminal device. The terminal device may perform the method provided by the embodiments of the present disclosure. When the terminal device performs the method, a display interface on a display screen thereof may be as shown in FIG. 2a or FIG. 2b. The terminal device may be other smart terminal devices having a touch function such as a smart phone, a tablet computer and a notebook computer having a touch function.

The embodiments of the present disclosure disclose a touch screen-based control method and apparatus, intended to achieve smooth display of an action indication region on a touch screen.

Referring to FIG. 1, it is a flowchart of a touch screen-based control method according to an embodiment of the present disclosure. The method includes, for example, the following steps:

Step S101: Detect a first touch point acting on a first icon. For example, the first touch point on a touch screen display is detected by processing circuitry of an information processing apparatus. The first touch point is associated with the first icon displayed on the touch screen display.

It may be understood that an icon may be used for visually displaying an achievable operation of the icon, each icon may correspond to an operation, and at least one icon may be displayed through a touch screen. The shape and size of icons may be identical or different. The icons may be distinguished by at least one or a combination of a text, a symbol, a pattern, and a color in the icon. As shown in FIG. 2a or FIG. 2b, icons 201a, 201b, 201c and 201d may be displayed on the touch screen (not fully displayed in FIG. 2a or FIG. 2b).

It is noted that the icon displayed on the touch screen at least includes a first icon. "First" described in the first icon, the first touch point and the like is used for identifying the icon or the touch point, and is not used for limiting the number.

It may be understood that a user may touch the touch screen with a touch object such as a finger or a capacitive stylus, so that a terminal where the touch screen is located detects a touch point triggered by the touch object on the touch screen. If the terminal detects that there is a touch point in a region where the first icon is displayed on the touch screen, the touch point is the first touch point acting on the first icon.

Step S102: Display an auxiliary operation icon corresponding to the first icon at a corresponding position of the first touch point. For example, the auxiliary operation icon corresponding to the first icon at a position corresponding to the first touch point is output for display.

It may be understood that the auxiliary operation icon is located in a user operation region, and the auxiliary operation icon may be used for determining the occurrence direction of a first action range of a first event corresponding to the first icon. For example, a skill button indicator anchor point in an MOBA game may be regarded as an auxiliary operation icon, the skill button indicator anchor point being used for determining the release direction of a game skill corresponding to a skill icon.

As shown in FIG. 2a or FIG. 2b, assuming that the first icon is 201c in FIG. 2a or FIG. 2b, when the user clicks on the first icon 201c, a position corresponding to a first touch point of the first icon 201c touched by the user's finger will display an auxiliary operation icon 202 corresponding to the first icon 201c.

Step S103: Fully display an auxiliary control region including the auxiliary operation icon on an operation interface, and display an action range candidate region in a scene picture. For example, the auxiliary control region, which includes the auxiliary operation icon, and an action range candidate region are output for display. The action range candidate region can be displayed in a displayed scene.

In some scenes, for example, a game scene, the operation interface refers to an interface having a game icon in the game scene, and the scene picture refers to a game battle picture in a game. The operation interface and the game picture are at different levels on the display. Usually, the operation interface is displayed on a UI layer, and the game picture is displayed on an operation layer.

The auxiliary control region is a user operation region, and the action range candidate region is a selection region for determining a first action range of a first event corresponding to the first icon. The auxiliary control region may be intersected with or separated from the action range candidate region. Referring to FIG. 2a or FIG. 2b, the terminal displays an auxiliary control region 203 and an action range candidate region 204. The auxiliary control region 203 needs to include the entire auxiliary operation icon 202 and is fully displayed on the operation interface, so that the auxiliary operation icon 202 can move along the entire edge of the auxiliary control region 203, and the occurrence direction of the first action range of the first event corresponding to the first icon 201c in the action range candidate region 204 may be directed to any direction of the scene picture. The first action range may be a circle, a sector, a straight line, and any irregular shape.

It is noted that since the first touch point position of the first icon 201c touched by the user is not necessarily the center position of the auxiliary control region 203, but the corresponding position of the first touch point is the display position of the auxiliary operation icon 202. It can be seen that the auxiliary operation icon 202 may be displayed at any position, including but not limited to the center position, within the auxiliary control region 203.

The action range candidate region 204 may be deformed and then drawn according to a stereoscopic display effect during display, so as to have the effect of the corresponding shape under the stereoscopic effect. For example, the circular action range candidate region 204 is an ellipse when drawn, but is a circle from a visual effect.

In an embodiment, the user selects the occurrence direction of the first action range of the first event corresponding to the first icon in the action range candidate region by dragging the auxiliary operation icon to move along or within the edge of the auxiliary control region. A final stop position of the auxiliary operation icon in the auxiliary control region is the occurrence direction of the first action range of the first event corresponding to the first icon in the action range candidate region. For example, 205 in FIG. 2a or FIG. 2b is the final stop position of the auxiliary operation icon 202 in the auxiliary control region 203, and the first action range of the first event corresponding to the first icon 201c in the action range candidate region 204 is a shadow region formed by diagonal lines shown in 206. As in an MOBA game, the shadow region 206 specifically refers to the direction of a game skill released by a current user game role 207 in the action range candidate region 204, and the auxiliary operation icon 202 is a special effect, an aperture and an operation for assisting the release of the game skill in the game scene.

It is noted that when the user drags the auxiliary operation icon to move along or within the edge of the auxiliary control region, the terminal may detect the movement of the first touch point, and when the first touch point moves, the terminal controls the first icon to move along a moving trajectory of the first touch point. For example, the first icon may be drawn centering on the first touch point and refreshed, so that the first icon visually moves along with the movement of a touch body.

In the present embodiment, for convenience of a user operation, the area of the action range candidate region is greater than the area of the auxiliary control region, thereby ensuring that the user operates within a relatively small auxiliary control region during the operation instead of greatly moving and operating within the range of the entire touch screen.

The auxiliary control region and the action range candidate region may be geometrically similar. For example, they are circles, ellipses, polygons or irregular figures with the same edge orientation. The shapes of the auxiliary control region and the action range candidate region may be different. For example, the auxiliary control region may be circular and the corresponding action range candidate region may be rectangular, or the auxiliary control region may be circular and the corresponding action range candidate region may be polygonal. It satisfies a condition that a position in the auxiliary control region can be mapped to a corresponding position in the action range candidate region.

For example, the auxiliary control region and the action range candidate region may both be centrally symmetric figures or axially symmetric figures. The centrally symmetric figure refers to a figure capable of rotating for 180 degrees around the center point thereof, wherein the figure obtained by rotating can coincide with the original figure. The centrally symmetric figure is, for example, a circle or a polygon with an even number of sides. The axially symmetric figure refers to a figure that can completely coincide after being folded along the axis of symmetry. The axially symmetric figure is, for example, a circle, a polygon, an ellipse, or the like.

Step S104: Record a first relative coordinate of the auxiliary operation icon relative to the auxiliary control region. For example, a first relative coordinate of the auxiliary operation icon within the auxiliary control region is determined by the processing circuitry.

It may be understood that the relative coordinate refers to a coordinate of a current coordinate relative to the position of the previous coordinate of the current coordinate in the same coordinate system. That is, the relative coordinate is a coordinate obtained by subtracting the same coordinate axes of the current coordinate and the previous coordinate of the current coordinate respectively. For example, in an XY coordinate system, a current coordinate is (7, 6), and the previous coordinate of the current coordinate is (2, 3), so a relative coordinate of the current coordinate (7, 6) relative to the previous coordinate (2, 3) is (5, 3).

Step S105: Map an action indication region to a position of a second relative coordinate relative to the action range candidate region according to the first relative coordinate, the second relative coordinate corresponding to the first relative coordinate. For example, a second relative coordinate of the action indication region to be displayed within the action range candidate region is determined by the processing circuitry according to the first relative coordinate.

Figure 3:
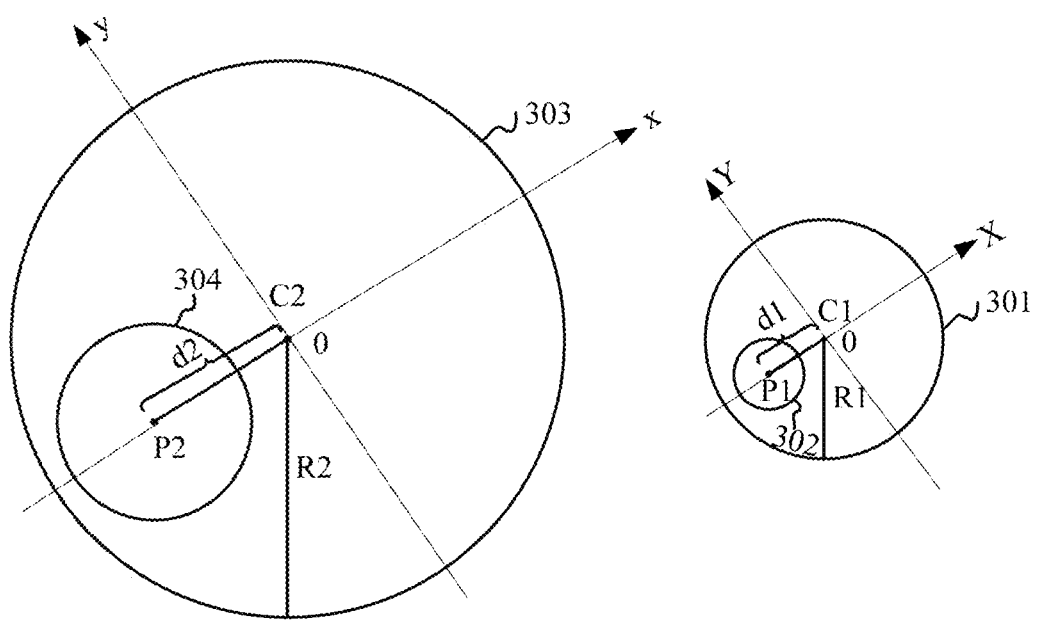
FIG. 3 is a schematic diagram of a representative position for obtaining an action indication region according to an embodiment of the present disclosure.

In an implementation manner, step S105 may refer to FIG. 3, and the auxiliary control region 301 is geometrically similar to the action range candidate region 303. A straight line where a center point C1 of the auxiliary control region 301 and a center point P1 of the auxiliary operation icon 302 are located is an X axis, a straight line perpendicular to the X axis is a Y axis, a point of intersection of the Y axis and the X axis is the center point C1, a first relative coordinate of the auxiliary operation icon 302 relative to the auxiliary control region 301 is a coordinate (−d1, 0) of the center point P1 in FIG. 3, and d1 is a known point.

An x axis parallel to the X axis in the auxiliary control region 301 is drawn in the action range candidate region 303, the x axis passes through the center point C2 of the action range candidate region 303, a straight line perpendicular to the x axis is a y axis, and a point of intersection of the y axis and the x axis is the center point C2, so a second relative coordinate of the action indication region 304 mapped to the action range candidate region is (−d2, 0).

It is assumed that the auxiliary control region 301 is circular, the radius is R1, the action range candidate region 303 is circular, the radius is R2, and the auxiliary operation icon 302 and the action indication region 304 are also circular. Then, d1/d2=R1/R2, so d2=(d1*R2)/R1. Since d1, R1 and R2 are all known quantities, the value of d2 may be obtained, and the center point P2 of the action indication region 304 may be determined on the x axis according to the value of d2. Then, the action indication region 304 is drawn by taking the center point P2 as the center and the preset radius of the action indication region 304 as the radius.

If the auxiliary control region and the action range candidate region are not geometrically similar, the terminal may establish a non-linear mapping relationship between the position in the auxiliary control region and the position in the action range candidate region in advance, so that the terminal may determine the position of the action indication region in the action range candidate region according to the non-linear mapping relationship and the position of the first touch point relative to the auxiliary control region.

Figure 4:
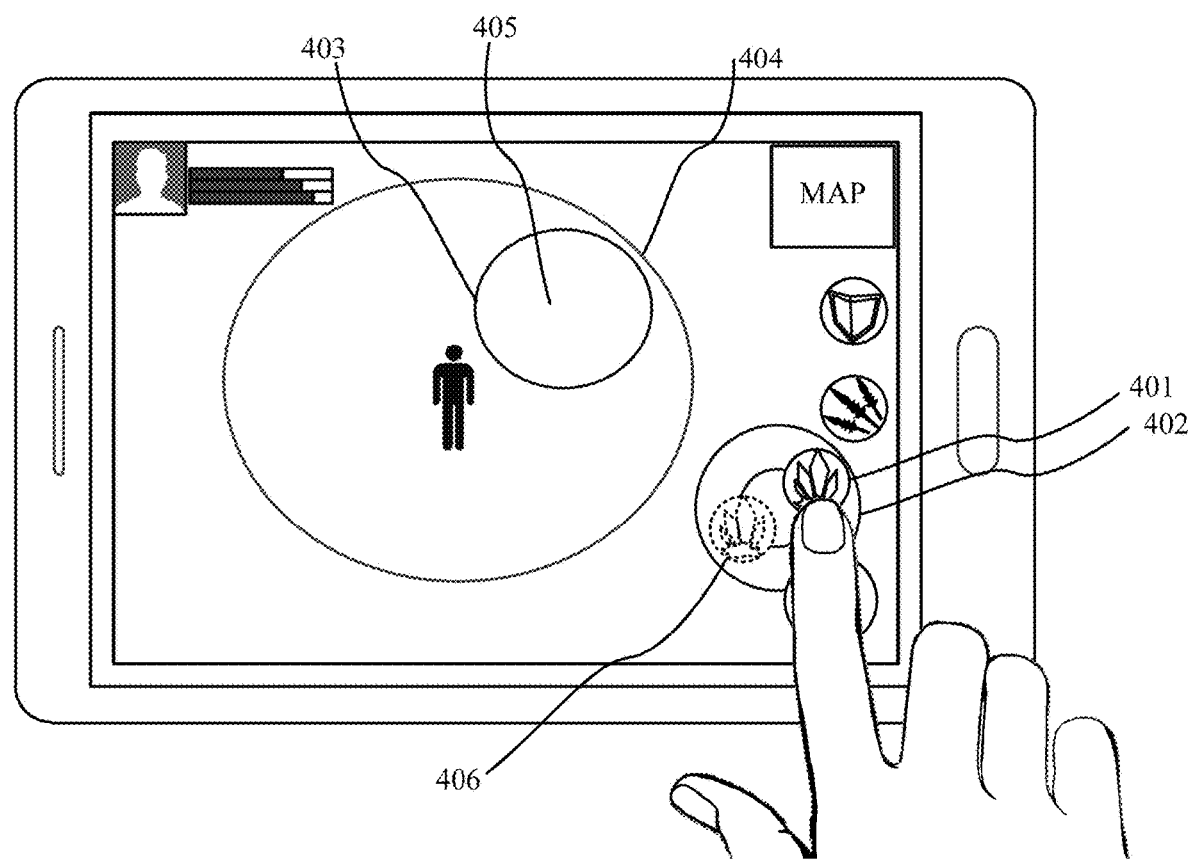
FIG. 4 illustrates a second interface for implementing a touch screen-based control method on a terminal according to an embodiment of the present disclosure.

For example, referring to FIG. 4, the user touches the first icon 401 to generate a first touch point, and drags the first icon 401 onto the auxiliary control region 402. At this time, the first icon 401 is at the upper right position relative to the auxiliary control region 402. Then, a representative position 405 of the action indication region 403 relative to the action range candidate region 404 may be calculated. A dotted line icon 406 in FIG. 4 indicates the position of the first icon 401 before movement.

In summary, the present disclosure discloses a touch screen-based control method. An auxiliary operation icon is displayed at a position where a user clicks on a first touch point of a first icon, and an auxiliary control region is displayed at a position including the auxiliary operation icon and fully displayed on an operation interface. It is ensured that the auxiliary operation icon is consistent with an actual position of the user's finger on a touch screen. Therefore, a mapping position of the action indication region in the action range candidate region is kept consistent with an actual click position of a user's finger, thereby achieving smooth display of the action indication region on the touch screen.

In addition, since the auxiliary control region in the present disclosure can be fully displayed on the operation interface, it is effective to ensure that the occurrence direction of an action range of an event corresponding to an icon in the action range candidate region may be any direction of a scene picture.

Figure 5:
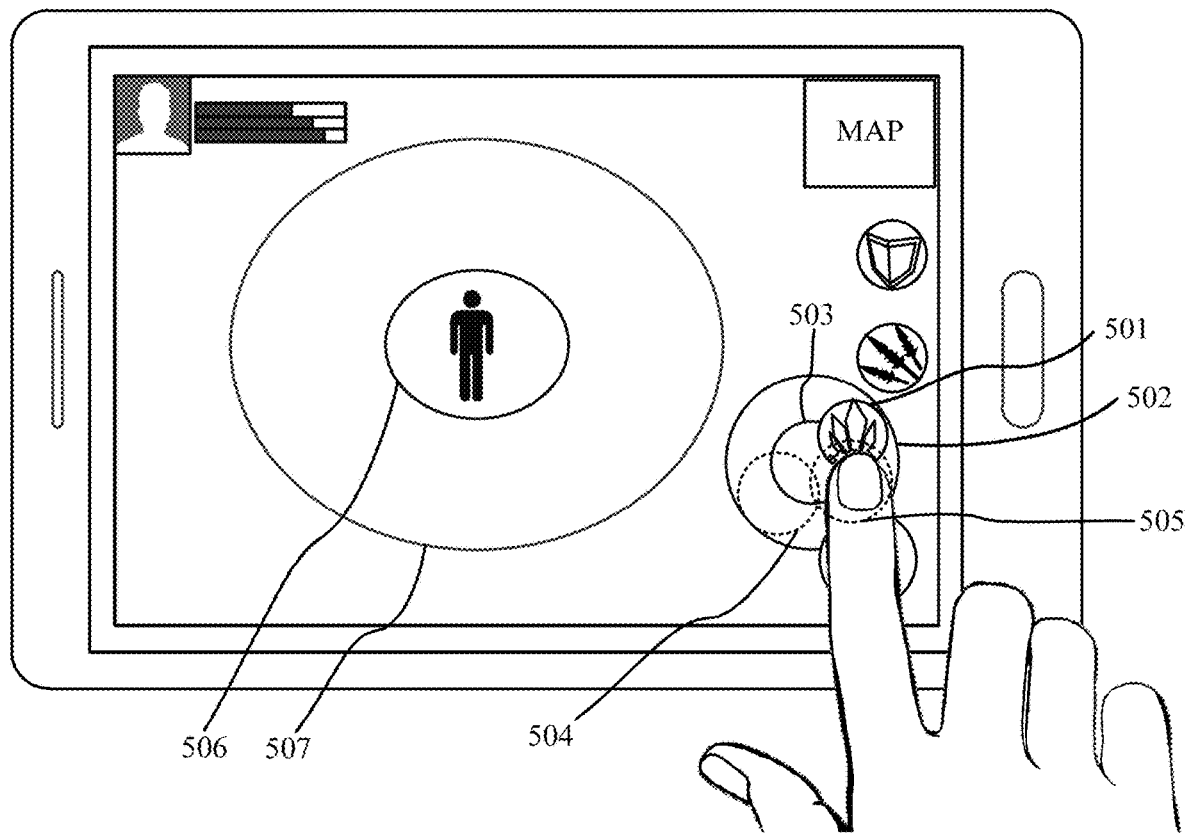
FIG. 5 is an operation diagram of a related touch screen-based control method.

To further illustrate the touch screen-based control method disclosed in the present disclosure to implement smooth display of an action indication region on a touch screen, referring to FIG. 5, an operation diagram of a traditional touch screen-based control method is shown. A terminal may display one or more icons on a touch screen. After a user touches a position 505 on one of the icons 501 displayed on the touch screen with a finger, an auxiliary control region 502 appears at a preset fixed position nearby the icon 501, and the center of the auxiliary control region 502 may be an auxiliary operation icon 503. When the user drags the auxiliary operation icon 503 to move to a target position 504 on the touch screen, the auxiliary operation icon 503 tends to first move to the position 505 where the user's finger first clicks on the icon 501, and then the auxiliary operation icon 503 moves from the position 505 to the target position 504 on the touch screen. Because a relative position of the auxiliary operation icon 503 in the auxiliary control region 502 is consistent with a relative position of the action indication region 506 in the action range candidate region 507, the action indication region 506 moves in the action range candidate region 507 according to a moving route of the auxiliary operation icon 503 in the auxiliary control region 502, thereby causing a stop-start effect on the display of the action indication region 506 on the touch screen, that is, a stop-start effect on the occurrence of an event corresponding to the icon 501 in the action range candidate region 507.

The touch screen-based control method disclosed in the present disclosure is to display the auxiliary operation icon (the auxiliary operation icon is the position 505 in the figure) at a touch point where the user's finger touches the icon 501, and then to fully display the auxiliary control region 502 including the auxiliary operation icon on the operation interface. Thus, it is ensured that an auxiliary operation icon is consistent with an actual position of a user's finger on a touch screen. A first relative coordinate reflects a relative position between the auxiliary operation icon 505 and the auxiliary control region 502, that is, it reflects a relative position between the actual click position of the user's finger and the auxiliary control region 502, and the position of a second relative coordinate of the action indication region 506 in the action range candidate region 507 is obtained by mapping according to the first relative coordinate. Therefore, the relative position of the action indication region 506 in the action range candidate region 507 is kept consistent with the relative position of the actual click position of the user's finger in the auxiliary control region 502, thereby avoiding a stop-start effect from occurring when the action indication region 506 is displayed due to inconsistency of the auxiliary operation icon 503 and the actual position of the user's finger on the touch screen in the traditional touch screen-based control method, and achieving smooth display of the action indication region 506 on the touch screen. To implement full display of an auxiliary control region including the auxiliary operation icon on an operation interface, step S103 of fully displaying an auxiliary control region including the auxiliary operation icon on an operation interface in the foregoing embodiment may include the following steps:

Draw an auxiliary control region including the auxiliary operation icon and fully displayed on the operation interface, or, display a pre-associated auxiliary control region including the auxiliary operation icon and fully displayed on the operation interface.

It may be understood that in an implementation manner of the present embodiment, after a user clicks on a first touch point of a first icon to display an auxiliary operation icon corresponding to the first icon, an auxiliary control region including the auxiliary operation icon may be drawn after a display position of the auxiliary operation icon is determined. If the center point of the auxiliary operation icon is centered, an auxiliary control region including the entire auxiliary operation icon and fully displayed on the operation interface is drawn.

Figure 6:
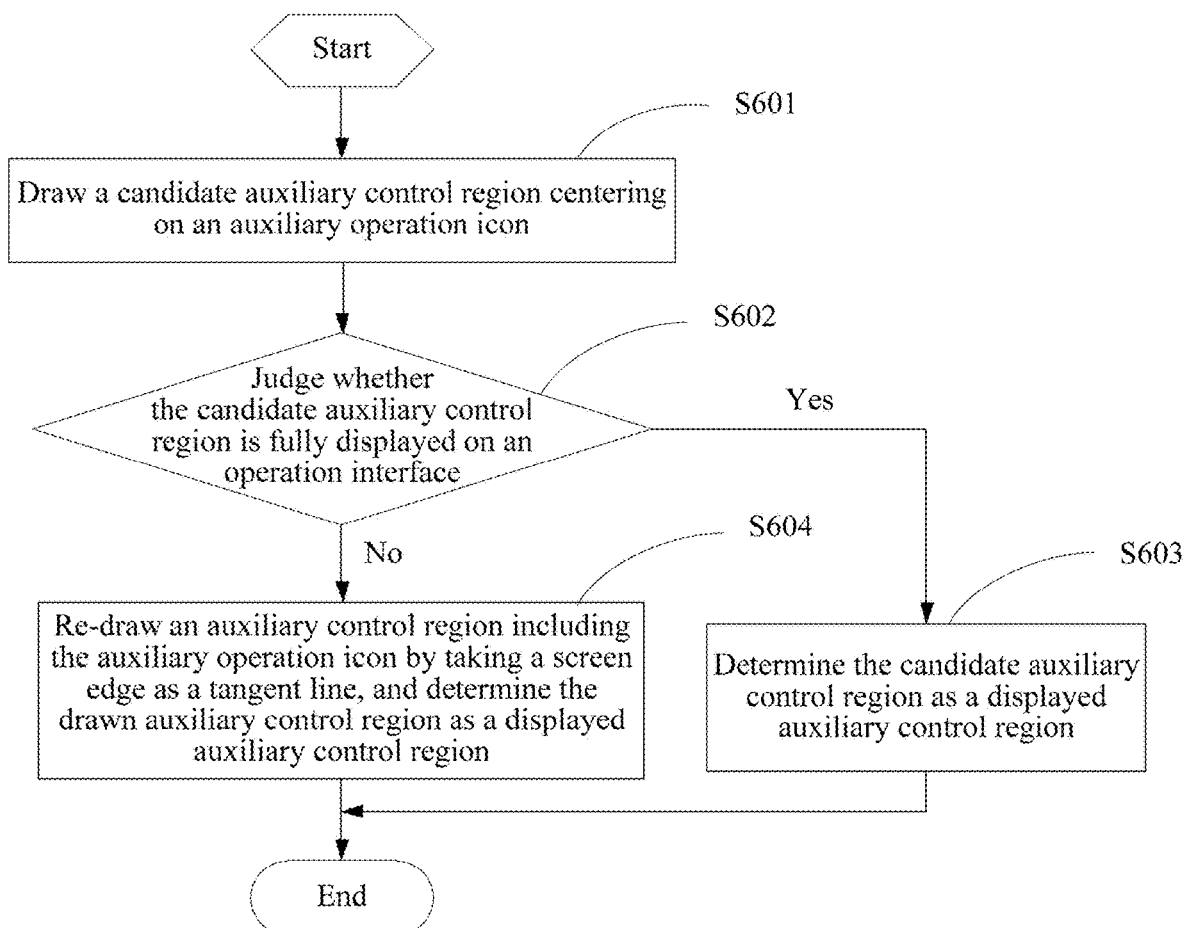
FIG. 6 is a flowchart of a method of drawing an auxiliary control region including an auxiliary operation icon and fully displayed on an operation interface according to an embodiment of the present disclosure.

As an example, referring to FIG. 6, it is a flowchart of a method of drawing an auxiliary control region including an auxiliary operation icon and fully displayed on an operation interface according to an embodiment of the present disclosure. The method includes the following steps:

Step S601: Draw a candidate auxiliary control region centering on an auxiliary operation icon.

It is noted that when the auxiliary operation icon is a centrally symmetric figure or an axially symmetric figure, the center point of the auxiliary operation icon may be taken as the center point of a candidate auxiliary control region, the candidate auxiliary control region including the auxiliary operation icon is drawn, and the candidate auxiliary control region is a centrally symmetric figure or an axially symmetric figure.

When the auxiliary operation icon is an asymmetric figure, a circumscribed circle including multiple edge points of the auxiliary operation icon shaped like the asymmetric figure may be drawn, and the center of the circumscribed circle is taken as the center point of the auxiliary operation icon, and then by taking the center point as the center point of the candidate auxiliary control region, a candidate auxiliary control region including the auxiliary operation icon is drawn.

Figure 7:
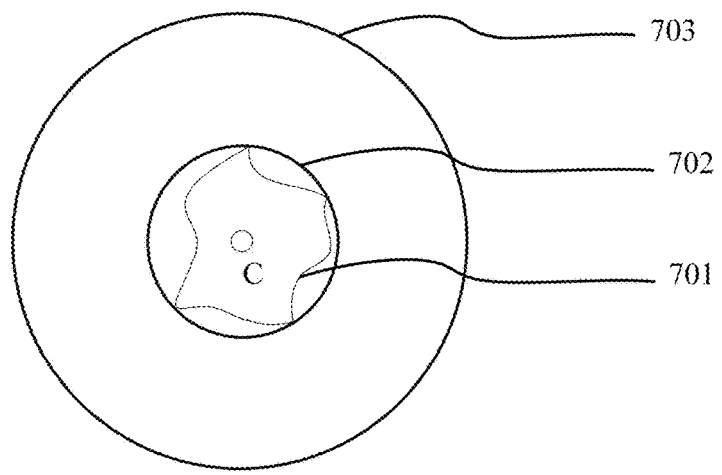
FIG. 7 is a schematic diagram of a representative position for drawing an auxiliary control region including an auxiliary operation icon and fully displayed on an operation interface according to an embodiment of the present disclosure.

For example, as shown in FIG. 7, when the auxiliary operation icon displayed at the first touch point of the first icon clicked by the user is the asymmetric figure shown in 701, a circumscribed circle 702 of the auxiliary operation icon 701 is drawn, the center C of the circumscribed circle 702 is determined, and then by taking the center C as the center point of the auxiliary control region, a candidate auxiliary control region 703 including the auxiliary operation icon 701 is drawn.

Step S602: Judge whether the candidate auxiliary control region is fully displayed on an operation interface, and if so, perform step S603.

Step S603: Determine the candidate auxiliary control region as a displayed auxiliary control region.

It is noted that in the present embodiment, the method for drawing a candidate auxiliary control region centering on an auxiliary operation icon is only an exemplary solution of drawing a candidate auxiliary control region. In practical application, other drawing solutions may be adopted. For example, a candidate auxiliary control region including the auxiliary operation icon is drawn with a certain edge of the auxiliary operation icon as a starting point for drawing a candidate auxiliary control region.

It is noted that when a drawn candidate auxiliary control region is not fully displayed on an operation interface, a candidate auxiliary control region can be re-drawn so as to ensure that the drawn candidate auxiliary control region is fully displayed on the operation interface.

Therefore, after step S602, the method may further include the following steps:

Step S604: Re-draw an auxiliary control region including the auxiliary operation icon by taking a screen edge as a tangent line if the candidate auxiliary control region is not fully displayed on the operation interface, and determine the drawn auxiliary control region as a displayed auxiliary control region.

Figure 8:
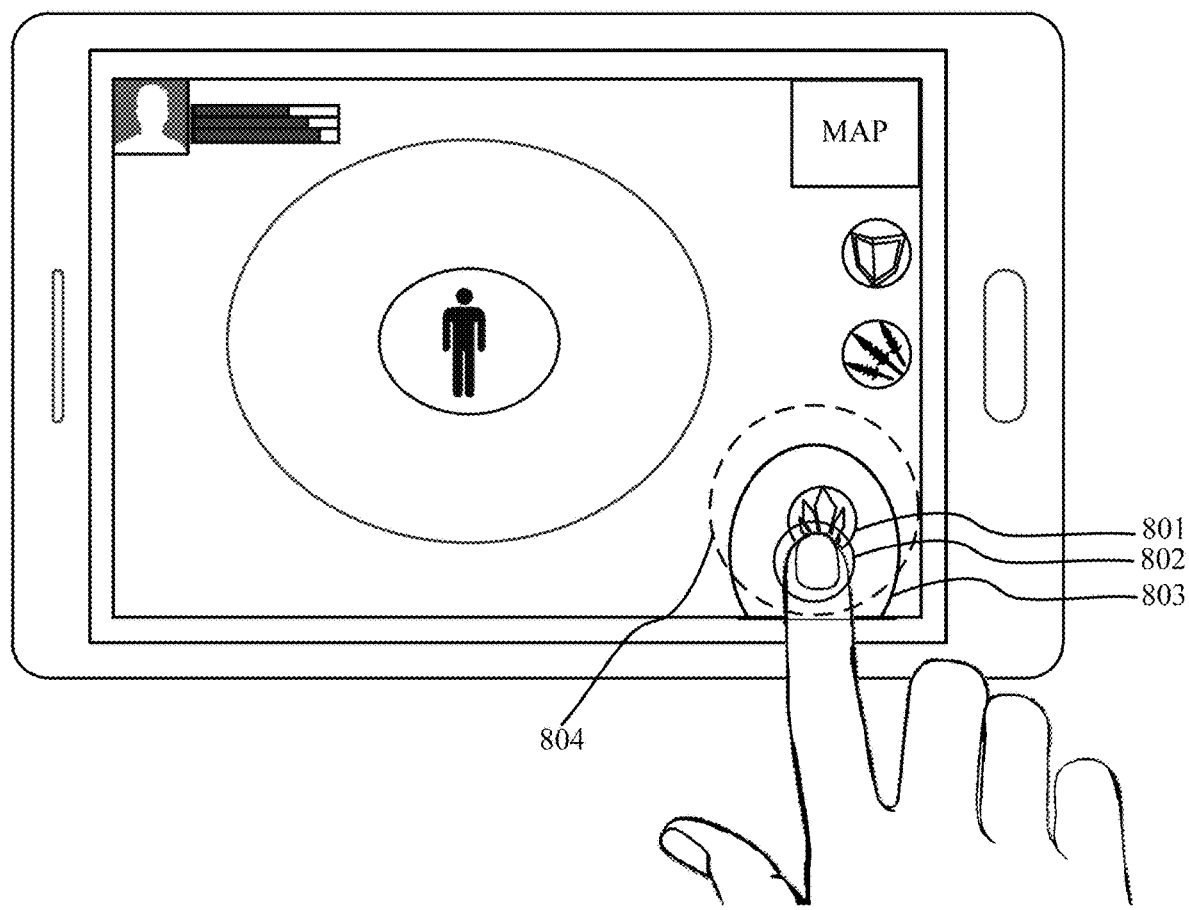
FIG. 8 illustrates a third interface for implementing a touch screen-based control method on a terminal according to an embodiment of the present disclosure.

It may be understood that referring to FIG. 8, after a user touches a first touch point of a first icon 801, an auxiliary operation icon 802 corresponding to the first icon 801 is displayed at a corresponding position of the first touch point, and then a candidate auxiliary control region 803 is drawn centering on the auxiliary operation icon 802. When the candidate auxiliary control region 803 is not fully displayed on an operation interface, the terminal will re-draw an auxiliary control region 804 including the auxiliary operation icon 802 by taking a screen edge as a tangent line.

In another implementation manner of the present embodiment, the terminal may also provide an auxiliary control region pre-associated with display of each icon for the icon displayed on the operation interface. That is, an auxiliary control region is displayed at a preset fixed position corresponding to each icon.

As an example, the step of displaying a pre-associated auxiliary control region including the auxiliary operation icon and fully displayed on the operation interface may include the following step:

Display a pre-associated auxiliary control region at a preset fixed position of the operation interface.

The preset fixed position is a position where the auxiliary control region can include the auxiliary operation icon and the auxiliary control region can be fully displayed in the operation interface. A specific position of the preset fixed position on the operation interface may be determined according to actual applications, and will not be limited herein in the present disclosure.

It may be understood that when the user touches the first icon of the operation interface, the current touch screen-based control on the first icon fails due to some reasons (for example, the terminal does not detect the first touch point of the user on the first icon). Under this situation, the terminal cannot display the auxiliary operation icon corresponding to the first icon at the corresponding position of the first touch point.

Figure 9:
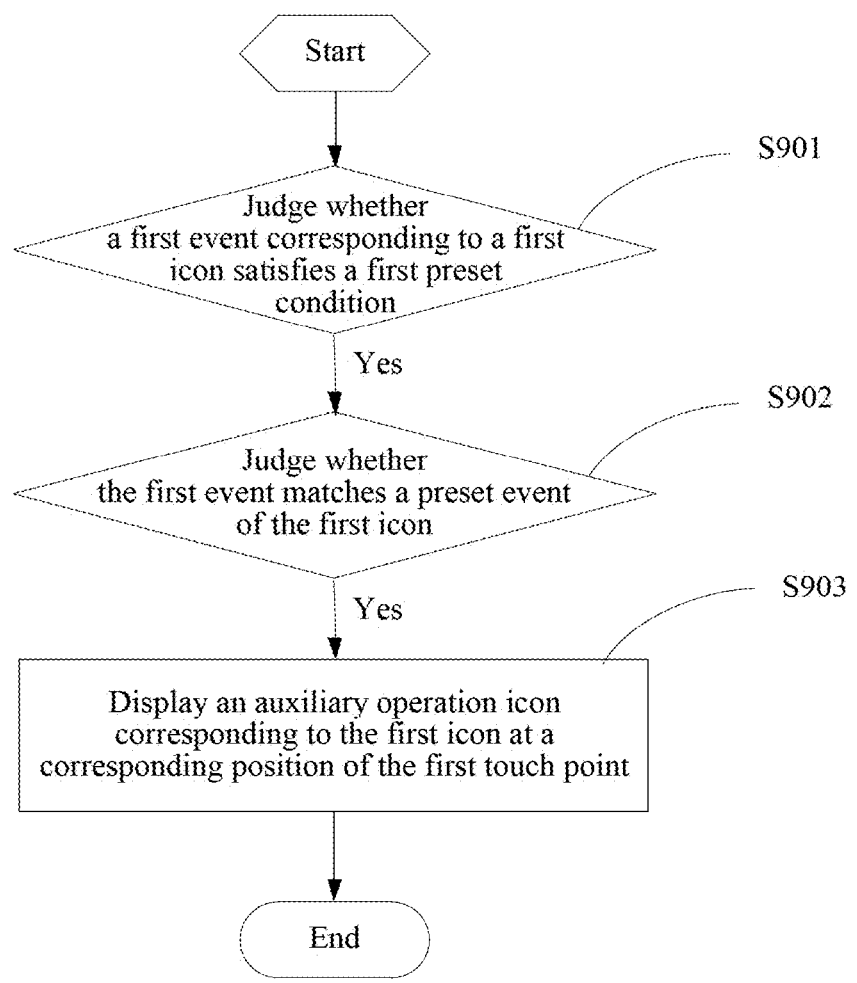
FIG. 9 is a flowchart of a method of displaying an auxiliary operation icon corresponding to a first icon at a corresponding position of a first touch point according to an embodiment of the present disclosure.

Therefore, to avoid resource waste and to ensure that the terminal displays the auxiliary operation icon corresponding to the first icon when the first event corresponding to the first icon is valid, referring to FIG. 9, the step of displaying an auxiliary operation icon corresponding to the first icon at a corresponding position of the first touch point specifically includes the following steps:

Step S901: Judge whether a first event corresponding to a first icon satisfies a first preset condition, and if so, perform step S902.

It may be understood that the first preset condition refers to a condition for determining that the first event corresponding to the first icon is valid, that is, a condition for determining that the current control of the user on the first icon is valid.

The first preset condition includes any one or more of the following conditions:

(1) A cooling time of the first event exceeds a preset time. The cooling time is set for limiting the occurrence frequency of events corresponding to the operation interface icon touched by the user within a period of time. The preset time is determined specifically according to actual applications as, for example, 0.3 s, and will not be limited herein in the present disclosure.

(2) A first touch point acting on a first icon is detected. It may be understood that when the user touches the first icon and the terminal does not detect the first touch point acting on the first icon, the current operation of the user on the first icon is an invalid operation. When the first touch point acting on the first icon is detected, the terminal triggers the occurrence of the first event corresponding to the first icon.

(3) No event conflicting with the first event occurs currently. It may be understood that if an event conflicting with the first event currently occurs, the first event occurrence process and the structure are inevitably affected. Therefore, the occurrence of the first event needs to be triggered after determining that the event conflicting with the first event does not occur currently.

Step S902: Judge whether the first event matches a preset event of the first icon, and if so, perform step S903.

It may be understood that the preset event of the first icon refers to a preset event when the user touches the first icon. For example, a preset event of a spell skill icon in an MOBA game is a spell.

It is noted that if the first event corresponding to the first icon does not satisfy the first preset condition, the current control process of the user on the first icon is ended.

Step S903: Display an auxiliary operation icon corresponding to the first icon at a corresponding position of the first touch point.

From each of the foregoing embodiments, it can be seen that the user may select the occurrence direction of the first action range of the first event corresponding to the first icon in the action range candidate region by dragging the auxiliary operation icon to move along or within the edge of the auxiliary control region. When the occurrence of the first event needs to be controlled, the traditional solution is that when the user stops touching the first touch point of the first icon (such as when the user's finger releases the touch on the first touch point), the first event occurs, that is, the first event occurs after the user clicks on the first icon for a single time. The inventor of the present application has found by study that the traditional solution of controlling the occurrence of a first event has a misoperation. For example, the user does not want to trigger the occurrence of the first event, but triggers, in the process of selecting the occurrence direction of the first event, the occurrence of the first event caused by careless touch on the first touch point due to finger release.

Figure 10:
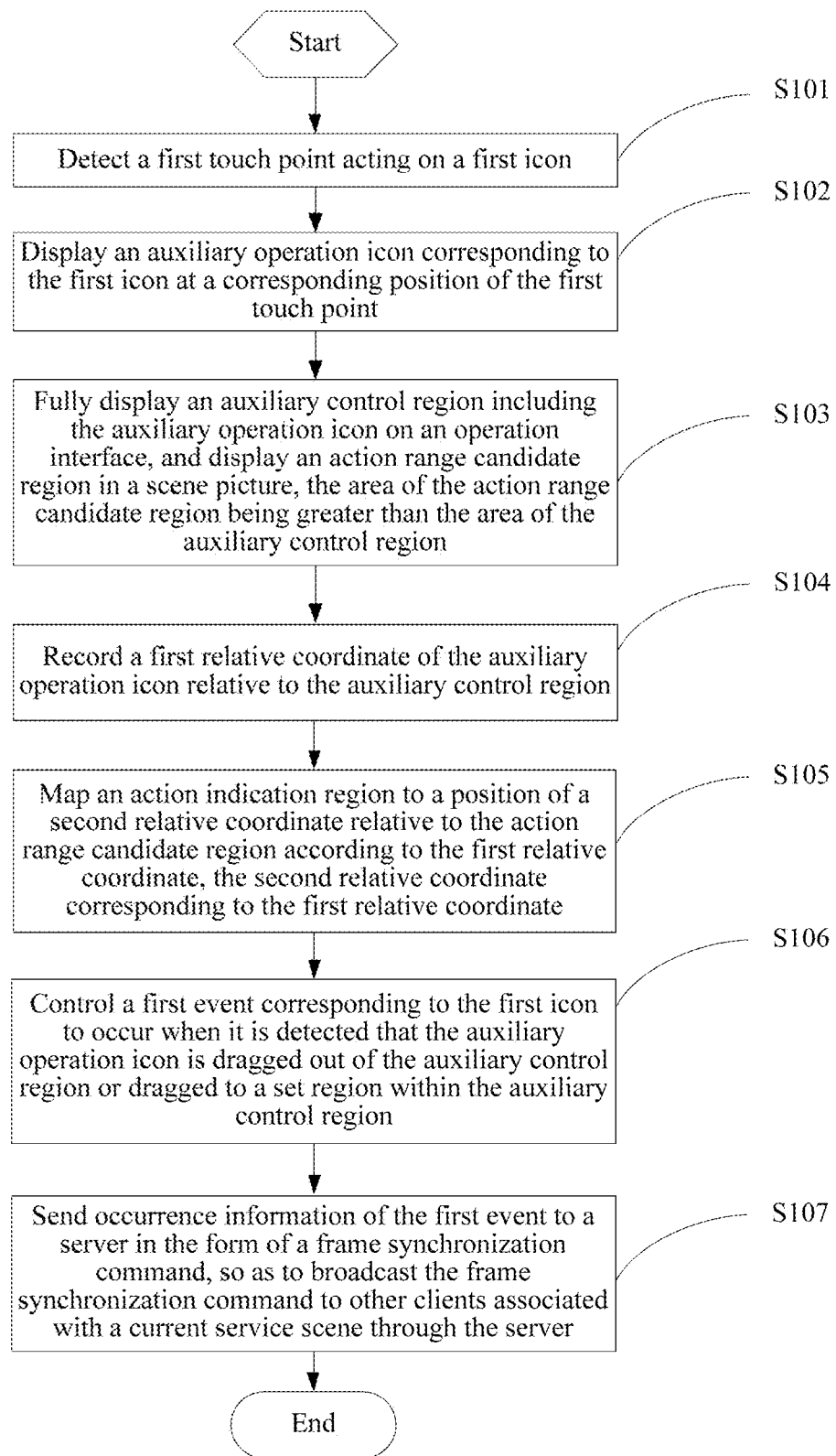
FIG. 10 is a flowchart of another touch screen-based control method according to an embodiment of the present disclosure.

In the embodiments of the present disclosure, to solve the problem of occurrence of a first event caused by misoperation, referring to FIG. 10, a flowchart of a touch screen-based control method according to another embodiment of the present disclosure is shown. On the basis of the embodiment shown in FIG. 1, after step S105, the control method further includes the following steps:

Step S106: Control a first event corresponding to the first icon to occur when it is detected that the auxiliary operation icon is dragged out of the auxiliary control region or dragged to a set region within the auxiliary control region.

In summary, compared with the conventional technology in which a user enables a first event corresponding to a first icon to occur by a single click on the first icon, the present embodiment does not trigger, after a single click on the first icon, the occurrence of the first event corresponding to the first icon, but when an auxiliary operation icon is dragged out of an auxiliary control region or dragged to a set region within the auxiliary control region, the first event is triggered to occur, thereby effectively solving the problem of event occurrence caused by misoperation.

When multiple clients cooperate in the same service scene (such as an MOBA game), one of the clients will notify the other clients associated with a current service scene through a server after controlling a corresponding event of a certain icon of the operation interface to occur, such that the other clients perform the same operation as the client subjected to event occurrence.

Therefore, to optimize the foregoing embodiment, after step S106, the method may further include the following steps:

Step S107: Send occurrence information of the first event to a server in the form of a frame synchronization command, so as to broadcast the frame synchronization command to other clients associated with a current service scene through the server.

It is noted that when other clients receive a frame synchronization command sent by the server, they will respectively perform consistency rule check on the currently occurring event of the client that sends the frame synchronization command, and the check content may include: (1) judging whether the currently occurring event is plugged in, and determining that the currently occurring event satisfies the consistency rule when it is determined that the currently occurring event is not plugged in; (2) judging the currently occurring event by comparing the currently occurring event with a pre-stored preset event of an icon corresponding to the event, and determining that the currently occurring event satisfies the consistency rule when the currently occurring event is consistent with the preset event; and (3) determining whether the currently occurring event occurs repeatedly during the current time period, and determining that the currently occurring event satisfies the consistency rule when it is determined that the currently occurring event does not occur repeatedly. The contents of the consistency rule check by each client include but are not limited to the above.

In summary, the present disclosure discloses a touch screen-based control method. An auxiliary operation icon is displayed at a position where a user clicks on a first touch point of a first icon, and an auxiliary control region is displayed at a position including the auxiliary operation icon and fully displayed on an operation interface. It is ensured that the auxiliary operation icon is consistent with an actual position of the user's finger on a touch screen. Therefore, a mapping position of the action indication region in the action range candidate region is kept consistent with an actual click position of a user's finger, thereby achieving smooth display of the action indication region on the touch screen.

In addition, since the auxiliary control region in the present disclosure can be fully displayed on the operation interface, it is effective to ensure that the occurrence direction of an action range of an event corresponding to an icon in the action range candidate region may be any direction of a scene picture. Furthermore, when the number of icons on the touch screen of the terminal is increased, the occurrence of a corresponding event of the icon near the edge of the touch screen can also be ensured.

Figure 11:
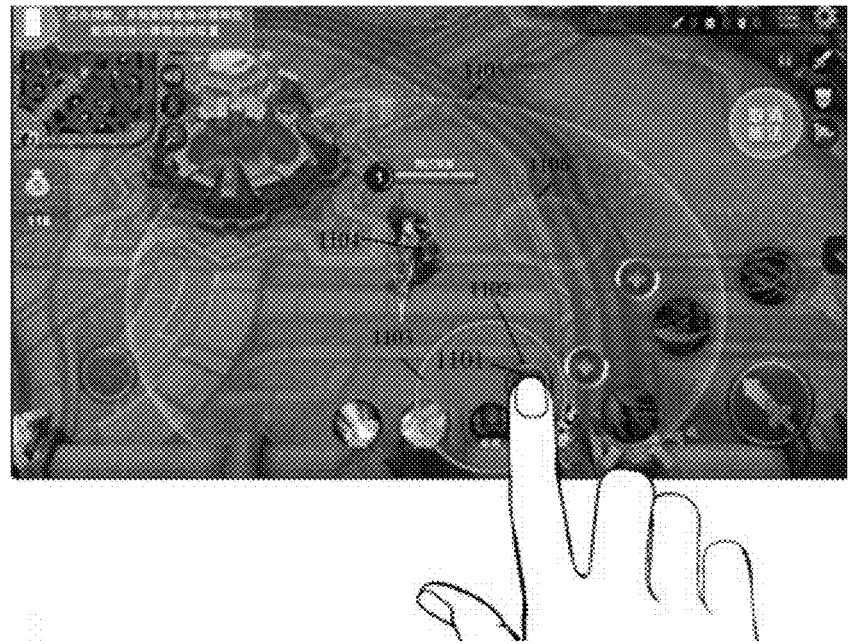
FIG. 11 illustrates a fourth interface for implementing a touch screen-based control method on a terminal according to an embodiment of the present disclosure.

The following illustrates the principle of the foregoing touch screen-based control method with a specific application scene. The present application scene is applied to an MOBA game in a mobile terminal, wherein an icon is a skill icon, an auxiliary control region is a skill button indicator range, an action range candidate region is a skill release range, both the skill button indicator range and the skill release range are circular, the area of the skill release range is greater than the area of the skill button indicator range, an auxiliary operation icon is a skill button indicator anchor point, and an action indication region is a skill indicator. The method specifically includes the following steps:

Display the skill release range on the touch screen centering on a current user role when the user clicks on a first skill icon displayed on the touch screen, and display the skill button indicator range at the edge of the touch screen. Referring to FIG. 11, the user clicks on a first skill icon 1101, a first skill corresponding to the first skill icon 1101 is a frozen magic, and the effect of spell is to cause a fixed-value injury to a virtual target located within a first skill release range and to reduce the speed of movement. A skill button indicator anchor point 1102 corresponding to the first skill icon 1101 is displayed at a corresponding position of a first touch point of the first skill icon 1101, and a skill button indicator range 1103 including the skill button indicator anchor point 1102 is fully displayed on an operation interface. At this time, a skill release range 1105 is displayed on the touch screen centering on a current user game role 1104. The terminal maps a skill indicator 1106 to the position of a second relative coordinate relative to the skill release range 1105 according to a first relative coordinate of the skill button indicator anchor point 1102 relative to the skill button indicator range 1103, the second relative coordinate corresponding to the first relative coordinate.

The user drags the skill button indicator anchor point 1102 to move in the edge of the skill button indicator range 1103 and selects a skill release direction of the current user game role 1104 within the skill release range 1105. When the user drags the skill button indicator anchor point 1102 out of the range of the skill button indicator range 1103 or drags the skill button indicator anchor point 1102 to a set region within the range of the skill button indicator range 1103, the current user game role 1104 releases a skill in the skill release direction selected by the user.

From the foregoing technical solutions, it can be seen that the present disclosure discloses a touch screen-based control method and apparatus. An auxiliary operation icon is displayed at a position where a user clicks on a first touch point of a first icon, and an auxiliary control region is displayed at a position including the auxiliary operation icon and fully displayed on an operation interface. It is ensured that the auxiliary operation icon is consistent with an actual click position of the user's finger on a touch screen. A first relative coordinate reflects a relative position between the auxiliary operation icon and the auxiliary control region, that is, it reflects a relative position between the actual click position of the user's finger and the auxiliary control region, and the position of a second relative coordinate of an action indication region in an action range candidate region is obtained by mapping according to the first relative coordinate. Therefore, the relative position of the action indication region in the action range candidate region is kept consistent with the relative position of the actual click position of the user's finger in the auxiliary control region, thereby preventing a stop-start effect from occurring when the action indication region is displayed on the touch screen, and achieving smooth display of the action indication region on the touch screen.

Corresponding to the foregoing method embodiment, the present disclosure also discloses a touch screen-based control apparatus.

Figure 12:
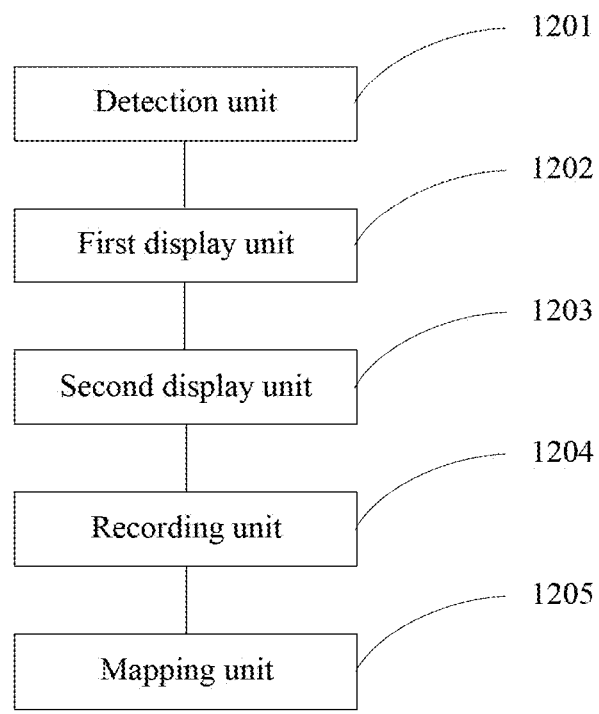
FIG. 12 is a structure diagram of an icon operation apparatus according to an embodiment of the present disclosure.

Referring to FIG. 12, a structure diagram of an icon operation apparatus according to an embodiment of the present disclosure is shown. The apparatus includes a detection unit 1201, a first display unit 1202, a second display unit 1203, a recording unit 1204, and a mapping unit 1205.

The detection unit 1201 is configured to detect a first touch point acting on a first icon.

It may be understood that an icon may be used for visually displaying an achievable operation of the icon, each icon may correspond to an operation, and at least one icon may be displayed through a touch screen. The shape and size of icons may be identical or different. The icons may be distinguished by at least one or a combination of more of a text, a symbol, a pattern, and a color in the icon. As shown in FIG. 2a or FIG. 2b, icons 201a, 201b, 201c and 201d may be displayed on the touch screen (not fully displayed in FIG. 2a or FIG. 2b).

It is noted that the icon displayed on the touch screen at least includes a first icon. "First" described in the first icon, the first touch point and the like is used for identifying the icon or the touch point, and is not used for limiting the number.

It may be understood that a user may touch the touch screen with a touch object such as a finger or a capacitive stylus, so that a terminal where the touch screen is located detects a touch point triggered by the touch object on the touch screen. If the terminal detects that there is a touch point in a region where the first icon is displayed on the touch screen, the touch point is the first touch point acting on the first icon.

The first display unit 1202 is configured to display an auxiliary operation icon corresponding to the first icon at a corresponding position of the first touch point.

It may be understood that the auxiliary operation icon is located in a user operation region, and the auxiliary operation icon may be used for determining the occurrence direction of a first action range of a first event corresponding to the first icon. For example, a skill button indicator anchor point in an MOBA game may be regarded as an auxiliary operation icon, the skill button indicator anchor point being used for determining the release direction of a game skill corresponding to a skill icon.

The second display unit 1203 is configured to fully display an auxiliary control region including the auxiliary operation icon on an operation interface, and display an action range candidate region in a scene picture.

In some scenes, for example, a game scene, the operation interface refers to an interface having a game icon in the game scene, and the scene picture refers to a game battle picture in a game. The operation interface and the game picture are at different levels on the display. Usually, the operation interface is displayed on a UI layer, and the game picture is displayed on an operation layer.

The auxiliary control region is a user operation region, and the action range candidate region is a selection region for determining a first action range of a first event corresponding to the first icon. The auxiliary control region may be intersected with or separated from the action range candidate region. Referring to FIG. 2a or FIG. 2b, the terminal displays an auxiliary control region 203 and an action range candidate region 204. The auxiliary control region 203 needs to include the entire auxiliary operation icon 202 and is fully displayed on the operation interface, so that the auxiliary operation icon 202 can move along the entire edge of the auxiliary control region 203, and the occurrence direction of the first action range of the first event corresponding to the first icon 201c in the action range candidate region 204 may be directed to any direction of a plane. The first action range may be a circle, a sector, a straight line, and any irregular shape.

It is noted that since the first touch point position of the first icon 201c touched by the user is not necessarily the center position of the auxiliary control region 203, but the auxiliary operation icon 202 displays the first touch point. Therefore, accordingly, the auxiliary operation icon 202 may be displayed at any position, including but not limited to the center position, within the auxiliary control region 203.

The action range candidate region 204 may be deformed and then drawn according to a stereoscopic display effect during display, so as to have the effect of the corresponding shape under the stereoscopic effect. For example, the circular action range candidate region 204 is an ellipse when drawn, but is a circle from a visual effect.

In an embodiment, the user selects the occurrence direction of the first action range of the first event corresponding to the first icon in the action range candidate region by dragging the auxiliary operation icon to move along or within the edge of the auxiliary control region. A final stop position of the auxiliary operation icon in the auxiliary control region is the occurrence direction of the first action range of the first event corresponding to the first icon in the action range candidate region. For example, 205 in FIG. 2a or FIG. 2b is the final stop position of the auxiliary operation icon 202 in the auxiliary control region 203, and the first action range of the first event corresponding to the first icon 201c in the action range candidate region 204 is a shadow region formed by diagonal lines shown in 206. In an MOBA game, the shadow region 206 specifically refers to the direction of a game skill released by a current user game role 207 in the action range candidate region 204, and the auxiliary operation icon 202 is a special effect, an aperture and an operation for assisting the release of the game skill in the game scene.

It is noted that when the user drags the auxiliary operation icon to move along or within the edge of the auxiliary control region, the terminal may detect the movement of the first touch point, and when the first touch point moves, the terminal controls the first icon to move along a moving trajectory of the first touch point. For example, the first icon may be drawn centering on the first touch point and refreshed, so that the first icon visually moves along with the movement of a touch body.

In the present embodiment, for convenience of a user operation, the area of the action range candidate region is greater than the area of the auxiliary control region, thereby ensuring that the user operates within a relatively small auxiliary control region during the operation instead of greatly moving and operating within the range of the entire touch screen.

The auxiliary control region and the action range candidate region may be geometrically similar. For example, they are circles, ellipses, polygons or irregular figures with the same edge orientation. The shapes of the auxiliary control region and the action range candidate region may be different. For example, the auxiliary control region may be circular and the corresponding action range candidate region may be rectangular, or the auxiliary control region may be circular and the corresponding action range candidate region may be polygonal. It satisfies a condition that a position in the auxiliary control region can be mapped to a corresponding position in the action range candidate region.

For example, the auxiliary control region and the action range candidate region may both be centrally symmetric figures or axially symmetric figures. The centrally symmetric figure refers to a figure capable of rotating for 180 degrees around the center point thereof, wherein the figure obtained by rotating can coincide with the original figure. The centrally symmetric figure is, for example, a circle or a polygon with an even number of sides. The axially symmetric figure refers to a figure that can completely coincide after being folded along the axis of symmetry. The axially symmetric figure is, for example, a circle, a polygon, an ellipse, or the like.

The recording unit 1204 is configured to record a first relative coordinate of the auxiliary operation icon relative to the auxiliary control region.

It may be understood that the relative coordinate refers to a coordinate of a current coordinate relative to the position of the previous coordinate of the current coordinate in the same coordinate system. That is, the relative coordinate is a coordinate obtained by subtracting the same coordinate axes of the current coordinate and the previous coordinate of the current coordinate respectively. For example, in an XY coordinate system, a current coordinate is (7, 6), and the previous coordinate of the current coordinate is (2, 3), so a relative coordinate of the current coordinate (7, 6) relative to the previous coordinate (2, 3) is (5, 3).

The mapping unit 1205 is configured to map an action indication region to a position of a second relative coordinate relative to the action range candidate region according to the first relative coordinate, the second relative coordinate corresponding to the first relative coordinate.

A specific working principle of the mapping unit 1205 refers to the corresponding part in the method embodiment and will not be elaborated herein.

In summary, the present disclosure discloses a touch screen-based control apparatus. An auxiliary operation icon is displayed at a position where a user clicks on a first touch point of a first icon, and an auxiliary control region is displayed at a position including the auxiliary operation icon and fully displayed on an operation interface. It is ensured that the auxiliary operation icon is consistent with an actual position of the user's finger on a touch screen. Therefore, a mapping position of the action indication region in the action range candidate region is kept consistent with an actual click position of a user's finger, thereby achieving smooth display of the action indication region on the touch screen.

In addition, since the auxiliary control region in the present disclosure can be fully displayed on the operation interface, it is effective to ensure that the occurrence direction of an action range of an event corresponding to an icon in the action range candidate region may be any direction of a scene picture.

To optimize the foregoing embodiment, the second display unit 1203 may specifically include:

a drawing unit, configured to draw an auxiliary control region including the auxiliary operation icon and fully displayed on the operation interface; or a display pre-association unit, configured to display a pre-associated auxiliary control region including the auxiliary operation icon and fully displayed on the operation interface.

It may be understood that in an implementation manner of the present embodiment, after a user clicks on a first touch point of a first icon to display an auxiliary operation icon corresponding to the first icon, an auxiliary control region including the auxiliary operation icon may be drawn after a display position of the auxiliary operation icon is determined. If the center point of the auxiliary operation icon is centered, an auxiliary control region including the entire auxiliary operation icon and fully displayed on the operation interface is drawn.

Furthermore, the terminal may also provide an auxiliary control region pre-associated with display of each icon for the icon displayed on the operation interface. That is, for each icon, an auxiliary control region is displayed at a preset fixed position corresponding to the image.

Figure 13:
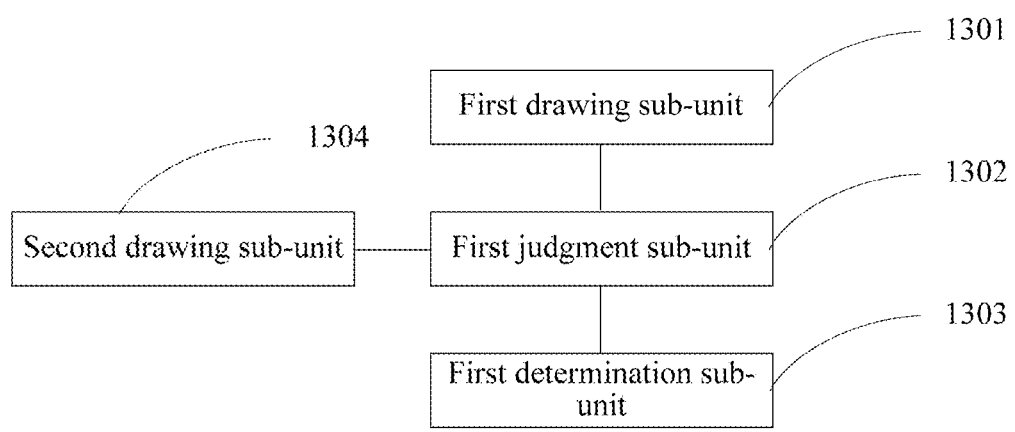
FIG. 13 is a structure diagram of a drawing unit according to an embodiment of the present disclosure.

As an example, referring to FIG. 13, a structure diagram of a drawing unit according to an embodiment of the present disclosure is shown. The drawing unit includes a first drawing sub-unit 1301, a first judgment sub-unit 1302 and a first determination sub-unit 1303.

The first drawing sub-unit 1301 is configured to draw a candidate auxiliary control region centering on the auxiliary operation icon.

It is noted that when the auxiliary operation icon is a centrally symmetric figure or an axially symmetric figure, the center point of the auxiliary operation icon may be taken as the center point of a candidate auxiliary control region, the candidate auxiliary control region including the auxiliary operation icon is drawn, and the candidate auxiliary control region can be a centrally symmetric figure or an axially symmetric figure.

When the auxiliary operation icon is an asymmetric figure, a circumscribed circle including multiple edge points of the auxiliary operation icon shaped like the asymmetric figure may be drawn, and the center of the circumscribed circle is taken as the center point of the auxiliary operation icon, and then by taking the center point as the center point of the candidate auxiliary control region, a candidate auxiliary control region including the auxiliary operation icon is drawn.

The first judgment sub-unit 1302 is configured to judge whether the candidate auxiliary control region is fully displayed on the operation interface.

The first determination sub-unit 1303 is configured to determine the candidate auxiliary control region as a displayed auxiliary control region if the judgment result of the first judgment sub-unit 1302 is Yes.

It is noted that in the present embodiment, the method for drawing a candidate auxiliary control region centering on an auxiliary operation icon is only an exemplary solution of drawing a candidate auxiliary control region. In practical application, other drawing solutions may be adopted. For example, a candidate auxiliary control region including the auxiliary operation icon is drawn with a certain edge of the auxiliary operation icon as a starting point for drawing a candidate auxiliary control region.

It is noted that when a drawn candidate auxiliary control region is not fully displayed on an operation interface, a candidate auxiliary control region can be re-drawn so as to ensure that the drawn candidate auxiliary control region is fully displayed on the operation interface.

Therefore, the drawing unit further includes:

a second drawing sub-unit 1304, configured to re-draw an auxiliary control region including the auxiliary operation icon by taking a screen edge as a tangent line if the judgment result of the first judgment sub-unit 1302 is No, and determine the drawn auxiliary control region as a displayed auxiliary control region.

A specific working principle of the second drawing sub-unit 1304 refers to the corresponding part in the method embodiment and will not be elaborated herein.

In another implementation manner of the present embodiment, the terminal may also provide an auxiliary control region pre-associated with display of each icon for the icon displayed on the operation interface. That is, an auxiliary control region is displayed at a preset fixed position corresponding to each icon.

As an example, the display pre-association unit in the foregoing embodiment includes:

a first display sub-unit, configured to display a pre-associated auxiliary control region at a preset fixed position of the operation interface, the preset fixed position being a position where the auxiliary control region can include the auxiliary operation icon and the auxiliary control region can be fully displayed in the operation interface. A specific position of the preset fixed position on the operation interface may be determined according to actual applications, and will not be limited herein in the present disclosure.

It may be understood that when the user touches the first icon of the operation interface, the current touch screen-based control on the first icon fails due to some reasons (for example, the terminal does not detect the first touch point of the user on the first icon). Under this situation, the terminal cannot display the auxiliary operation icon corresponding to the first icon at the corresponding position of the first touch point.

Figure 14:
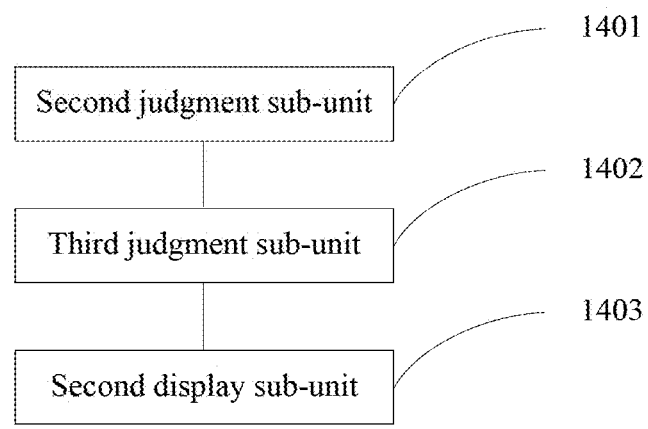
FIG. 14 is a structure diagram of a first display unit according to an embodiment of the present disclosure.

Therefore, to avoid resource waste to ensure that the terminal displays the auxiliary operation icon corresponding to the first icon when the first event corresponding to the first icon is valid, referring to FIG. 14, a structure diagram of a first display unit according to an embodiment of the present disclosure is shown. The first display unit includes a second judgment sub-unit 1401, a third judgment sub-unit 1402 and a second display sub-unit 1403.

The second judgment sub-unit 1401 is configured to judge whether a first event corresponding to the first icon satisfies a first preset condition.

It may be understood that the first preset condition refers to a condition for determining that the first event corresponding to the first icon is valid, that is, a condition for determining that the current control of the user on the first icon is valid.

The first preset condition includes any one or more of the following conditions:

(1) A cooling time of the first event exceeds a preset time. The cooling time is set for limiting the occurrence frequency of events corresponding to the operation interface icon touched by the user within a period of time. The preset time is determined specifically according to actual applications as, for example, 0.3 s, and will not be limited herein in the present disclosure.

(2) A first touch point acting on a first icon is detected. It may be understood that when the user touches the first icon and the terminal does not detect the first touch point acting on the first icon, the operation of the user on the first icon is an invalid operation. When the terminal detects the first touch point acting on the first icon, the terminal triggers the occurrence of the first event corresponding to the first icon.

(3) No event conflicting with the first event occurs currently. It may be understood that if an event conflicting with the first event currently occurs, the first event occurrence process and the structure are inevitably affected. Therefore, the occurrence of the first event needs to be triggered when determining that the event conflicting with the first event does not occur currently.

The third judgment sub-unit 1402 is configured to judge whether the first event matches a preset event of the first icon if the judgment result of the second judgment sub-unit 1401 is Yes.

It may be understood that the preset event of the first icon refers to a preset event when the user touches the first icon. For example, a preset event of a spell skill icon in an MOBA game is a spell.

It is noted that if the first event corresponding to the first icon does not satisfy the first preset condition, the current control process of the user on the first icon is ended.

The second display sub-unit 1403 is configured to display an auxiliary operation icon corresponding to the first icon at a corresponding position of the first touch point if the judgment result of the third judgment sub-unit 1402 is Yes.

From each of the foregoing embodiments, it can be seen that the user selects the occurrence direction of the first action range of the first event corresponding to the first icon in the action range candidate region by dragging the auxiliary operation icon to move along or within the edge of the auxiliary control region. When the occurrence of the first event needs to be controlled, the traditional solution is that when the user stops touching the first touch point of the first icon (such as when the user's finger releases the touch on the first touch point), the first event occurs, that is, the first event occurs after the user clicks on the first icon for a single time. The inventor of the present application has found by study that the traditional solution of controlling the occurrence of a first event has a misoperation. For example, the user does not want to trigger the occurrence of the first event, but triggers, in the process of selecting the occurrence direction of the first event, the occurrence of the first event caused by careless touch on the first touch point due to finger release.

Figure 15:
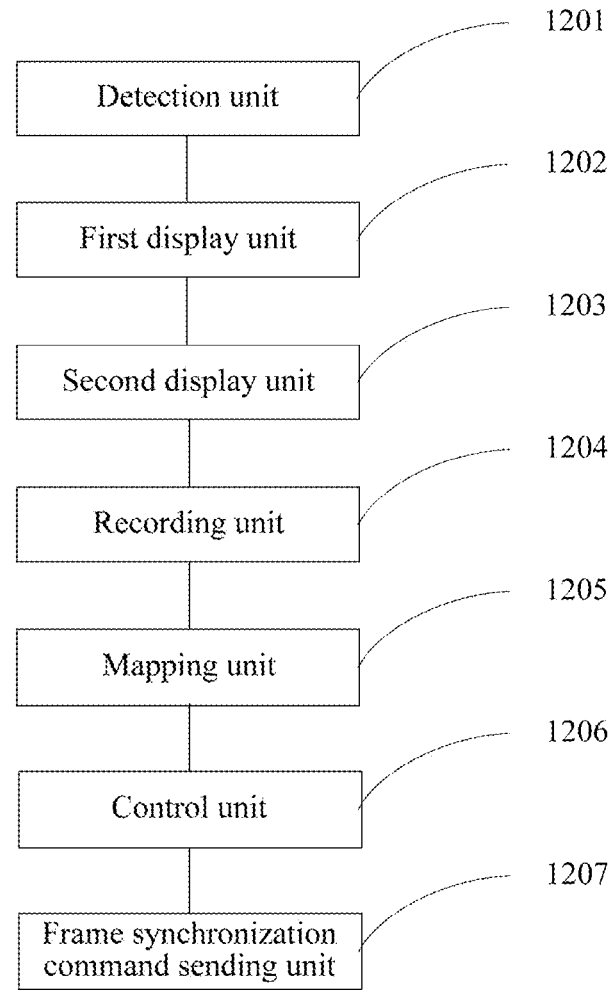
FIG. 15 is a structure diagram of another icon operation apparatus according to an embodiment of the present disclosure.

In the embodiments of the present disclosure, to solve the problem of occurrence of a first event caused by misoperation, referring to FIG. 15, a structure diagram of a control apparatus according to another embodiment of the present disclosure is shown. On the basis of the embodiment shown in FIG. 12, the control apparatus further includes:

a control unit 1206, configured to control a first event corresponding to the first icon to occur when it is detected that the auxiliary operation icon is dragged out of the auxiliary control region or dragged to a set region within the auxiliary control region after the mapping unit 1205 maps an action indication region to a position of a second relative coordinate relative to the action range candidate region according to the first relative coordinate.

In summary, compared with the conventional technology in which a user enables a first event corresponding to a first icon to occur by a single click on the first icon, the present embodiment does not trigger, after a single click on the first icon, the occurrence of the first event corresponding to the first icon, but when an auxiliary operation icon is dragged out of an auxiliary control region or dragged to a set region within the auxiliary control region, the first event is triggered to occur, thereby effectively solving the problem of event occurrence caused by misoperation.

When multiple clients cooperate in the same service scene (such as an MOBA game), one of the clients will notify the other clients associated with a current service scene through a server after controlling a corresponding event of a certain icon of the operation interface to occur, such that the other clients perform the same operation as the client subjected to event occurrence.

Therefore, to optimize the foregoing embodiment, the control apparatus further includes:

a frame synchronization command sending unit 1207, configured to send occurrence information of the first event to a server in the form of a frame synchronization command after the control unit 1206 controls a first event corresponding to the first icon to occur, so as to broadcast the frame synchronization command to other clients associated with a current service scene through the server.

It is noted that when other clients receive a frame synchronization command sent by the server, they will respectively perform consistency rule check on the currently occurring event of the client that sends the frame synchronization command, and the check content may include: (1) judging whether the currently occurring event is plugged in, and determining that the currently occurring event satisfies the consistency rule when it is determined that the currently occurring event is not plugged in; (2) judging whether the currently occurring event meets requirements by comparing the currently occurring event with a pre-stored preset event of an icon corresponding to the event, and determining that the currently occurring event satisfies the consistency rule when the currently occurring event is consistent with the preset event; and (3) determining whether the currently occurring event occurs repeatedly during the current time period, and determining that the currently occurring event satisfies the consistency rule when it is determined that the currently occurring event does not occur repeatedly. The contents of the consistency rule check by each client include but are not limited to the above.

From the foregoing technical solutions, it can be seen that the present disclosure discloses a touch screen-based control method and apparatus. An auxiliary operation icon is displayed at a position where a user clicks on a first touch point of a first icon, and an auxiliary control region is displayed at a position including the auxiliary operation icon and fully displayed on an operation interface. It is ensured that the auxiliary operation icon is consistent with an actual click position of the user's finger on a touch screen. A first relative coordinate reflects a relative position between the auxiliary operation icon and the auxiliary control region, that is, it reflects a relative position between the actual click position of the user's finger and the auxiliary control region, and the position of a second relative coordinate of an action indication region in an action range candidate region is obtained by mapping according to the first relative coordinate. Therefore, the relative position of the action indication region in the action range candidate region kept consistent with the relative position of the actual click position of the user's finger in the auxiliary control region, thereby preventing a stop-start effect from occurring when the action indication region is displayed on the touch screen, and achieving smooth display of the action indication region on the touch screen.

In addition, since the auxiliary control region in the present disclosure can be fully displayed on the operation interface, it is effective to ensure that the occurrence direction of an action range of an event corresponding to an icon in the action range candidate region may be any direction of a scene picture. Furthermore, when the number of icons on the touch screen of the terminal is increased, the occurrence of a corresponding event of the icon near the edge of the touch screen can also be ensured.

It is noted that a specific working principle of each component in the apparatus embodiment refers to the corresponding part in the method embodiment and will not be elaborated herein.

Figure 16:
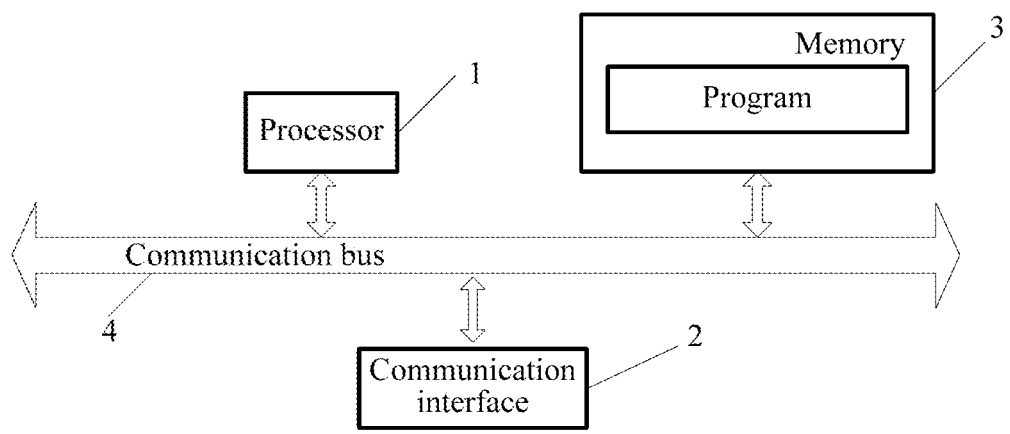
FIG. 16 is a hardware structure diagram of a terminal device according to an embodiment of the present disclosure.

The present disclosure also provides a terminal device. The terminal device includes the foregoing control apparatus. FIG. 16 illustrates a hardware structure of the terminal device. Referring to FIG. 16, the terminal device may include a processor 1, a communication interface 2, a memory 3, and a communication bus 4.

The processor 1, the communication interface 2 and the memory 3 complete communication with each other through the communication bus 4.

Optionally, the communication interface 2 may be an interface of a communication module such as an interface of a GSM module.

The processor 1 is configured to execute a program.

The memory 3 is configured to store the program.

The program may include a program code. The program code includes a computer operation instruction.

The processor 1 may be a Central Processing Unit (CPU), or an Application Specific Integrated Circuit (ASIC), or one or more integrated circuits configured to implement the embodiments of the present disclosure.

The memory 3 may include a high-speed RAM, and may also include a non-volatile memory such as at least one disk memory.

The program may be specifically used for:

detecting a first touch point acting on a first icon;

displaying an auxiliary operation icon corresponding to the first icon at a corresponding position of the first touch point;

fully displaying an auxiliary control region including the auxiliary operation icon on an operation interface, and displaying an action range candidate region in a scene picture, the area of the action range candidate region being greater than the area of the auxiliary control region;

recording a first relative coordinate of the auxiliary operation icon relative to the auxiliary control region; and mapping an action indication region to a position of a second relative coordinate relative to the action range candidate region according to the first relative coordinate, the second relative coordinate corresponding to the first relative coordinate.

The embodiments of the present disclosure also provide a terminal device. The terminal device includes the foregoing control apparatus. FIG. 16 illustrates a hardware structure of the terminal device. Referring to FIG. 16, the terminal device may include a processor 1, a communication interface 2, a memory 3, and a communication bus 4.

The processor 1, the communication interface 2 and the memory 3 complete communication with each other through the communication bus 4.

Optionally, the communication interface 2 may be an interface of a communication module such as an interface of a GSM module.

The processor 1 is configured to execute a program.

The memory 3 is configured to store the program.

The program may include a program code. The program code includes a computer operation instruction.

The processor 1 may be a Central Processing Unit (CPU), or an Application Specific Integrated Circuit (ASIC), or one or more integrated circuits configured to implement the embodiments of the present disclosure.

The memory 3 may include a high-speed RAM, and may also include a non-volatile memory such as at least one disk memory.

The program may be specifically used for:

detecting a first touch point acting on a first icon;

displaying an auxiliary operation icon corresponding to the first icon at a corresponding position of the first touch point;

fully displaying an auxiliary control region including the auxiliary operation icon on an operation interface, and displaying an action range candidate region in a scene picture, the area of the action range candidate region being greater than the area of the auxiliary control region;

recording a first relative coordinate of the auxiliary operation icon relative to the auxiliary control region; and mapping an action indication region to a position of a second relative coordinate relative to the action range candidate region according to the first relative coordinate, the second relative coordinate corresponding to the first relative coordinate.

The embodiments of the present disclosure also provide a storage medium. The storage medium is configured to store a program code for performing any one implementation manner in the touch screen-based control method described in each of the foregoing embodiments.

The embodiments of the present disclosure also provide a computer program product including an instruction. When the computer program product is run on a computer, the computer is enabled to perform any one implementation manner in the touch screen-based control method described in each of the foregoing embodiments.

It is noted that the relational terms herein such as first and second are used to differentiate an entity or operation from another entity or operation, and do not imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements related in the process, the method, the article, or the device that includes the element.

The embodiments in this specification are all described in a progressive manner. Description of each of the embodiments focuses on differences from other embodiments, and reference may be made to each other for the same or similar parts among respective embodiments.

The above description of the disclosed embodiments enables those skilled in the art to make or use the present disclosure. Various modifications to these embodiments are obvious to those skilled in the art, and the general principles defined herein may be implemented in other embodiments without departing from the spirit or scope of the present disclosure. Therefore, the present disclosure is not to be limited to the embodiments shown herein, but the broadest scope consistent with the principle and novel characteristics disclosed herein is to be accorded.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

What is claimed is:

1. A method, comprising:
    detecting, by processing circuitry of an information processing apparatus, a first touch point on a touch screen display that is associated with a first icon displayed on the touch screen display;
    outputting, for display on the touch screen display and by the processing circuitry in response to the detected first touch point, an auxiliary control region, an auxiliary operation indicator at a position of the first touch point within the auxiliary control region, and an action range candidate region in a displayed scene;
    determining, by the processing circuitry, a final stop position of the auxiliary operation indicator within the auxiliary control region when a drag operation is performed on the auxiliary operation indicator;
    determining, by the processing circuitry, a first relative coordinate of the auxiliary operation indicator within the auxiliary control region based on the first touch point and the final stop position, the first relative coordinate indicating a movement direction of the drag operation performed on the auxiliary operation indicator; and
    determining, by the processing circuitry, a second relative coordinate of an action indication region to be displayed within the action range candidate region according to the first relative coordinate, the action indication region being displayed based on the movement direction of the drag operation performed on the auxiliary operation indicator.

2. The method of claim 1, wherein the action range candidate region is larger than the auxiliary control region.

3. The method of claim 1, wherein the outputting comprises:
    outputting the auxiliary operation indicator for display on an operation interface of an application executed by the information processing apparatus, the operation interface being configured to provide an icon selection region for at least one icon that is user selectable and corresponds to an event to be executed in the displayed scene.

4. The method of claim 3, wherein the auxiliary control region that includes the auxiliary operation indicator is fully displayed on the operation interface.

5. The method of claim 4, wherein the outputting comprises:
    adjusting a position of the auxiliary control region based on a determination that the auxiliary control region when drawn around the auxiliary operation indicator cannot be fully displayed on the operation interface.

6. The method of claim 5, wherein the outputting comprises:
    adjusting the position of the auxiliary control region to be tangent to an edge of the touch screen display when the auxiliary control region drawn around the auxiliary operation indicator cannot be fully displayed on the operation interface.

7. The method of claim 4, wherein the outputting comprises:
    outputting the auxiliary control region at a fixed position of the operation interface that is associated with the first icon.

8. The method of claim 1, wherein the outputting comprises:
    determining whether a first event condition corresponding to the first icon is satisfied; and
    outputting the auxiliary operation indicator at the position of the first touch point when the first event condition is determined to be satisfied.

9. The method of claim 8, wherein the first event condition is at least one of:
    whether a cooling time of a first event exceeds a preset time;
    whether the first touch point on the first icon is detected; or
    whether an event conflicts with the first event.

10. The method of claim 1, further comprising:
    controlling, by the processing circuitry, a first event corresponding to the first icon to occur when the auxiliary operation indicator is dragged outside of the auxiliary control region or dragged to another position within the auxiliary control region.

11. The method of claim 10, further comprising:
    sending, by the processing circuitry, a first frame synchronization command that indicates the occurrence of the first event to a server, a second frame synchronization command being broadcast by the server to other clients associated with the displayed scene.

12. An information processing apparatus, comprising:
    processing circuitry configured to:
        detect a first touch point on a touch screen display that is associated with a first icon displayed on the touch screen display;
        output, for display on the touch screen display and in response to the detected first touch point, an auxiliary control region, an auxiliary operation indictor at a position of the first touch point within the auxiliary control region, and an action range candidate region in a displayed scene;
        determine a final stop position of the auxiliary operation indicator within the auxiliary control region when a drag operation is performed on the auxiliary operation indicator;
        determine a first relative coordinate of the auxiliary operation indicator within the auxiliary control region based on the first touch point and the final stop position, the first relative coordinate indicating a movement direction of the drag operation performed on the auxiliary operation indicator; and
        determine a second relative coordinate of an action indication region to be displayed within the action range candidate region according to the first relative coordinate, the action indication region being displayed based on the movement direction of the drag operation performed on the auxiliary operation indicator.

13. The information processing apparatus of claim 12, wherein the action range candidate region is larger than the auxiliary control region.

14. The information processing apparatus of claim 12, wherein the auxiliary control region that includes the auxiliary operation indicator is fully displayed on an operation interface of an application executed by the processing circuitry, the operation interface being configured to provide an icon selection region for at least one icon that is user selectable and corresponds to an event to be executed in the displayed scene.

15. The information processing apparatus of claim 14, wherein the processing circuitry is configured to:
    adjust a position of the auxiliary control region based on a determination that the auxiliary control region when drawn around the auxiliary operation indicator cannot be fully displayed on the operation interface.

16. The information processing apparatus of claim 15, wherein the processing circuitry is configured to:
    adjust the position of the auxiliary control region to be tangent to an edge of the touch screen display when the auxiliary control region drawn around the auxiliary operation indicator cannot be fully displayed on the operation interface.

17. The information processing apparatus of claim 14, wherein the processing circuitry is configured to:
    output the auxiliary control region at a fixed position of the operation interface that is associated with the first icon.

18. The information processing apparatus of claim 12, wherein the processing circuitry is configured to:
    determine whether a first event condition corresponding to the first icon is satisfied; and
    output the auxiliary operation indicator at the position of the first touch point when the first event condition is determined to be satisfied,
    the first event condition being at least one of:
    whether a cooling time of a first event exceeds a preset time;
    whether the first touch point on the first icon is detected; or
    whether an event conflicts with the first event.

19. The information processing apparatus of claim 12, wherein the processing circuitry is further configured to:
    control a first event corresponding to the first icon to occur when the auxiliary operation indicator is dragged outside of the auxiliary control region or dragged to another position within the auxiliary control region; and
    send a first frame synchronization command that indicates the occurrence of the first event to a server, a second frame synchronization command being broadcast by the server to other clients associated with the displayed scene.

20. A non-transitory computer-readable storage medium storing instructions which when executed by at least one processor cause the at least one processor to perform:
    detecting a first touch point on a touch screen display that is associated with a first icon displayed on the touch screen display;
    outputting, for display on the touch screen display and in response to the detected first touch point, an auxiliary control region, an auxiliary operation indicator at a position of the first touch point within the auxiliary control region, and an action range candidate region in a displayed scene;
    determining a final stop position of the auxiliary operation indicator within the auxiliary control region when a drag operation is performed on the auxiliary operation indicator;
    determining a first relative coordinate of the auxiliary operation indicator within the auxiliary control region based on the first touch point and the final stop position, the first relative coordinate indicating a movement direction of the drag operation performed on the auxiliary operation indicator; and
    determining a second relative coordinate of an action indication region to be displayed within the action range candidate region according to the first relative coordinate, the action indication region being displayed based on the movement direction of the drag operation performed on the auxiliary operation indicator.

* * * * *